(12) United States Patent
Duarte et al.

(10) Patent No.: US 12,380,306 B2
(45) Date of Patent: Aug. 5, 2025

(54) METHOD OF DETECTING A CONCEALED PATTERN

(71) Applicant: PPG INDUSTRIES OHIO, INC., Cleveland, OH (US)

(72) Inventors: Nicolas B. Duarte, Allison Park, PA (US); Zachary J. Brown, Austin, TX (US); Juan F. Choreno, Zumpango (MX); Julian M. Galvan-Miyoshi, Texcoco (MX); Darin W. Laird, Pittsburgh, PA (US); Alejandro Morones Dobarganes, Tepexpan (MX); Jose Alberto Olivares Lecona, Mexico City (MX); Stuart D. Hellring, Pittsburgh, PA (US); Michael A. Zalich, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 18/771,446

(22) Filed: Jul. 12, 2024

(65) Prior Publication Data
US 2024/0370683 A1    Nov. 7, 2024

Related U.S. Application Data

(63) Continuation of application No. 18/361,725, filed on Jul. 28, 2023, now Pat. No. 12,050,950, which is a
(Continued)

(51) Int. Cl.
G06K 19/06    (2006.01)
B05D 5/06    (2006.01)
(Continued)

(52) U.S. Cl.
CPC .......... G06K 19/0614 (2013.01); B05D 5/06 (2013.01); B05D 7/52 (2013.01); G06K 7/12 (2013.01)

(58) Field of Classification Search
None
See application file for complete search history.

(56) References Cited

U.S. PATENT DOCUMENTS 2,395,442 A    2/1946 Ballard
2,659,075 A    11/1953 Collins et al.
(Continued)

FOREIGN PATENT DOCUMENTS

AT    163962 T    3/1998
AU    2002320745 A1    1/2003
(Continued)

OTHER PUBLICATIONS

Office Action received for Chinese Patent Application No. 201780066470.X, mailed on Oct. 8, 2022, 25 pages (12 pages of English Translation and 13 pages of Original Document).
(Continued)

*Primary Examiner* — Kristy A Haupt

(57) ABSTRACT

A method for detecting a component including a concealed pattern includes: detecting infrared electromagnetic radiation reflected or emitted by a component including a first pattern, the component including: a substrate; the first pattern disposed over at least a portion of the substrate; an optional primer layer disposed between at least a portion of the substrate and at least a portion of the first pattern; and a first visibly opaque layer including an infrared transparent pigment, the first visibly opaque layer disposed over at least a portion of the first pattern; and comparing the reflectivity and/or absorbance of infrared electromagnetic radiation by the first pattern at one wavelength to the reflectivity and/or
(Continued)

absorbance by the primer layer and/or the substrate at the same wavelength.

20 Claims, 11 Drawing Sheets

Related U.S. Application Data continuation of application No. 17/879,279, filed on Aug. 2, 2022, now Pat. No. 11,809,933, which is a continuation of application No. 17/293,813, filed as application No. PCT/US2019/060897 on Nov. 12, 2019, now Pat. No. 11,461,607.

(60) Provisional application No. 62/760,371, filed on Nov. 13, 2018.

(51) Int. Cl.
*B05D 7/00* (2006.01)
*G06K 7/12* (2006.01)

(56) References Cited

U.S. PATENT DOCUMENTS

| | | | |
|---|---|---|---|
| 2,758,298 A | 8/1956 | Sunstein | |
| 2,901,747 A | 8/1959 | Sunstein | |
| 3,870,528 A | 3/1975 | Edds et al. | |
| 4,148,039 A | 4/1979 | Lunden | |
| 4,157,924 A | 6/1979 | Elms et al. | |
| 4,180,609 A | 12/1979 | Vassiliou | |
| 4,186,036 A | 1/1980 | Elms et al. | |
| 4,220,675 A | 9/1980 | Imazaki | |
| 4,244,741 A | 1/1981 | Kruse | |
| 4,415,922 A | 11/1983 | Reymond et al. | |
| 4,598,020 A | 7/1986 | Panush | |
| 4,714,623 A | 12/1987 | Riccio et al. | |
| 4,717,949 A | 1/1988 | Eichenlaub | |
| 4,869,532 A | 9/1989 | Abe et al. | |
| 4,933,056 A | 6/1990 | Corrigan et al. | |
| 5,037,475 A | 8/1991 | Chida et al. | |
| 5,039,598 A | 8/1991 | Abramsohn et al. | |
| 5,228,009 A | 7/1993 | Forestieri et al. | |
| 5,366,252 A | 11/1994 | Nishida et al. | |
| 5,389,101 A | 2/1995 | Heilbrun et al. | |
| 5,416,058 A | 5/1995 | Uyttendaele et al. | |
| 5,503,904 A | 4/1996 | Yoshinaga et al. | |
| 5,530,043 A | 6/1996 | Zawacky et al. | |
| 5,591,255 A | 1/1997 | Small et al. | |
| 5,667,891 A | 9/1997 | Batzar et al. | |
| 5,760,107 A | 6/1998 | Valko et al. | |
| 5,820,987 A | 10/1998 | Kaufman et al. | |
| 5,863,321 A | 1/1999 | Crumley et al. | |
| 5,864,626 A | 1/1999 | Braun et al. | |
| 5,871,827 A | 2/1999 | Jaffe et al. | |
| 5,907,293 A | 5/1999 | Tognazzini | |
| 5,910,119 A | 6/1999 | Lin | |
| 5,971,767 A | 10/1999 | Kaufman et al. | |
| 5,989,642 A | 11/1999 | Singer et al. | |
| 6,024,455 A | 2/2000 | O'Neill et al. | |
| 6,151,014 A | 11/2000 | Zloter et al. | |
| 6,184,279 B1 | 2/2001 | Anderson et al. | |
| 6,242,056 B1 | 6/2001 | Spencer et al. | |
| 6,245,855 B1 | 6/2001 | Swarup et al. | |
| 6,306,505 B1 | 10/2001 | Mauer et al. | |
| 6,356,376 B1 | 3/2002 | Tonar et al. | |
| 6,366,397 B1 | 4/2002 | Genjima et al. | |
| 6,387,519 B1 | 5/2002 | Anderson et al. | |
| 6,458,336 B1 | 10/2002 | El-Tamer et al. | |
| 6,520,915 B2 | 2/2003 | Lin et al. | |
| 6,521,038 B2 | 2/2003 | Yanagimoto et al. | |
| 6,525,111 B1 | 2/2003 | Spencer et al. | |
| 6,544,596 B2 | 4/2003 | Clemens et al. | |
| 6,585,622 B1 | 7/2003 | Shum et al. | |
| 6,590,049 B1 | 7/2003 | O'Dwyer et al. | |
| 6,623,556 B2 | 9/2003 | Zama et al. | |
| 6,657,734 B1 | 12/2003 | Monz et al. | |
| 6,700,692 B2 | 3/2004 | Tonar et al. | |
| 6,849,338 B2 | 2/2005 | Clemens et al. | |
| 6,863,851 B2 | 3/2005 | Josephy et al. | |
| 6,875,800 B2 | 4/2005 | Vanier et al. | |
| 7,005,472 B2 | 2/2006 | Anderson et al. | |
| 7,137,713 B2 | 11/2006 | Harasawa et al. | |
| 7,211,324 B2 | 5/2007 | Kamimori et al. | |
| 7,241,500 B2 | 7/2007 | Shiao et al. | |
| 7,466,415 B2 | 12/2008 | Gibson et al. | |
| 7,663,798 B2 | 2/2010 | Tonar et al. | |
| 7,820,088 B2 | 10/2010 | Josephy et al. | |
| 7,906,199 B2 | 3/2011 | Rearick et al. | |
| 7,910,634 B2 | 3/2011 | Desaw et al. | |
| 7,954,281 B2 | 6/2011 | Jaster | |
| 7,959,981 B2 | 6/2011 | Sadvary et al. | |
| 8,006,909 B2 | 8/2011 | Swiler et al. | |
| 8,108,169 B2 | 1/2012 | Martin | |
| 8,123,850 B2 | 2/2012 | Niewold | |
| 8,129,466 B2 | 3/2012 | Polk et al. | |
| 8,202,616 B2 | 6/2012 | Suzuki et al. | |
| 8,247,761 B1 | 8/2012 | Agrawal et al. | |
| 8,362,130 B2 | 1/2013 | Demartin et al. | |
| 8,679,617 B2 | 3/2014 | Eibon et al. | |
| 8,724,894 B1 | 5/2014 | Jensen et al. | |
| 8,784,941 B2 | 7/2014 | Richter et al. | |
| 8,822,025 B2 | 9/2014 | Decker et al. | |
| 8,835,008 B2 | 9/2014 | Richter et al. | |
| 8,841,375 B2 | 9/2014 | Peri et al. | |
| 8,846,194 B2 | 9/2014 | Maruoka et al. | |
| 9,034,445 B2 | 5/2015 | Edwards et al. | |
| 9,056,584 B2 | 6/2015 | Fish et al. | |
| 9,056,988 B2 | 6/2015 | Decker et al. | |
| 9,057,835 B2 | 6/2015 | Hellring et al. | |
| 9,174,239 B2 | 11/2015 | Doessel et al. | |
| 9,255,173 B2 | 2/2016 | Edwards | |
| 9,369,689 B1 | 6/2016 | Tran et al. | |
| 9,482,657 B2 | 11/2016 | Bell et al. | |
| 9,598,597 B2 | 3/2017 | Chasser et al. | |
| 9,612,369 B2 | 4/2017 | Banerjee et al. | |
| 9,658,375 B2 | 5/2017 | Banerjee | |
| 9,662,920 B2 | 5/2017 | Kozee et al. | |
| 9,664,832 B2 | 5/2017 | Banerjee | |
| 9,678,260 B2 | 6/2017 | Banerjee | |
| 9,714,361 B2 | 7/2017 | Edwards | |
| 9,739,917 B2 | 8/2017 | Banerjee et al. | |
| 9,801,693 B1 | 10/2017 | Kim-Whitty | |
| 9,810,824 B2 | 11/2017 | Banerjee et al. | |
| 9,840,807 B2 | 12/2017 | Luzon | |
| 9,850,705 B2 | 12/2017 | Dean et al. | |
| 9,880,263 B2 | 1/2018 | Droz et al. | |
| 9,996,765 B2 | 6/2018 | Yajko | |
| 10,023,746 B2 | 7/2018 | Henglein et al. | |
| 10,048,415 B2 | 8/2018 | Banerjee et al. | |
| 10,131,838 B2 | 11/2018 | Berdahl | |
| 10,174,213 B2 | 1/2019 | Kruesemann et al. | |
| 10,191,348 B2 | 1/2019 | Luten et al. | |
| 10,215,855 B2 | 2/2019 | Decker et al. | |
| 10,240,064 B2 | 3/2019 | Kabagambe et al. | |
| 10,311,590 B1 | 6/2019 | Ebrahimi et al. | |
| 10,373,033 B2 | 8/2019 | Picard et al. | |
| 10,502,879 B1 | 12/2019 | Northcott et al. | |
| 10,619,053 B2 | 4/2020 | McQuown et al. | |
| 10,641,895 B2 | 5/2020 | Decker et al. | |
| 10,690,823 B2 | 6/2020 | Banerjee et al. | |
| 10,769,581 B1 | 9/2020 | Brazeau | |
| 10,788,608 B2 | 9/2020 | Banerjee et al. | |
| 10,870,740 B2 | 12/2020 | Wu et al. | |
| 10,901,086 B2 | 1/2021 | Decker et al. | |
| 10,927,267 B2 | 2/2021 | Zalich et al. | |
| 11,037,328 B1 | 6/2021 | Marschner et al. | |
| 11,065,843 B2 | 7/2021 | Hoehne et al. | |
| 11,086,053 B2 | 8/2021 | Banerjee et al. | |
| 11,118,068 B2 | 9/2021 | McQuown et al. | |
| 11,364,668 B2 | 6/2022 | Wells | |
| 11,370,925 B2 | 6/2022 | Zalich et al. | |
| 11,428,012 B2 | 8/2022 | Daniels et al. | |
| 11,461,607 B2 | 10/2022 | Duarte et al. | |

(56) References Cited

U.S. PATENT DOCUMENTS

| | | |
|---|---|---|
| 11,561,329 B2 | 1/2023 | Fang et al. |
| 11,565,476 B2 | 1/2023 | Rumbak et al. |
| 11,578,239 B2 | 2/2023 | Sun et al. |
| 11,584,860 B2 | 2/2023 | Zalich et al. |
| 11,589,964 B2 | 2/2023 | Andersen et al. |
| 11,591,464 B2 | 2/2023 | Lewis et al. |
| 11,617,707 B2 | 4/2023 | Schilling et al. |
| 11,808,833 B2 | 11/2023 | Decker et al. |
| 11,809,933 B2 | 11/2023 | Duarte et al. |
| 11,977,154 B2 | 5/2024 | Decker et al. |
| 2002/0071948 A1 | 6/2002 | Duff et al. |
| 2002/0086115 A1 | 7/2002 | Lamers et al. |
| 2002/0094320 A1 | 7/2002 | Toan et al. |
| 2002/0114955 A1 | 8/2002 | Lamers et al. |
| 2002/0154379 A1 | 10/2002 | Tonar et al. |
| 2002/0186148 A1 | 12/2002 | Trajkovic et al. |
| 2002/0188051 A1 | 12/2002 | Hugo |
| 2003/0030041 A1 | 2/2003 | Genjima et al. |
| 2003/0054160 A1 | 3/2003 | Fisher et al. |
| 2003/0086605 A1 | 5/2003 | Doner |
| 2003/0089171 A1 | 5/2003 | Kenefick et al. |
| 2003/0108689 A1 | 6/2003 | Tan et al. |
| 2003/0125189 A1 | 7/2003 | Castro et al. |
| 2003/0167080 A1 | 9/2003 | Hart et al. |
| 2003/0185993 A1 | 10/2003 | Kamimori et al. |
| 2003/0203991 A1 | 10/2003 | Schottman et al. |
| 2004/0018360 A1 | 1/2004 | Hugo |
| 2004/0037455 A1 | 2/2004 | Klingensmith et al. |
| 2004/0068046 A1 | 4/2004 | Hugo |
| 2004/0142205 A1 | 7/2004 | Chen et al. |
| 2004/0191540 A1 | 9/2004 | Jakobi et al. |
| 2004/0194663 A1 | 10/2004 | Li |
| 2004/0210056 A1 | 10/2004 | Wood et al. |
| 2004/0219214 A1 | 11/2004 | Gravett et al. |
| 2004/0220322 A1 | 11/2004 | Gooding et al. |
| 2005/0007645 A1 | 1/2005 | Tonar et al. |
| 2005/0050658 A1 | 3/2005 | Chan et al. |
| 2005/0075551 A1 | 4/2005 | Horn et al. |
| 2005/0080171 A1 | 4/2005 | Reisacher et al. |
| 2005/0090609 A1 | 4/2005 | Reisacher et al. |
| 2005/0109443 A1 | 5/2005 | Sleiman et al. |
| 2005/0120290 A1 | 6/2005 | Mistry et al. |
| 2005/0129871 A1 | 6/2005 | Ruther et al. |
| 2005/0129964 A1 | 6/2005 | Hugo |
| 2005/0154308 A1 | 7/2005 | Quistgaard et al. |
| 2005/0175558 A1 | 8/2005 | Nielson et al. |
| 2005/0186423 A1 | 8/2005 | Johnson et al. |
| 2005/0203395 A1 | 9/2005 | Sui et al. |
| 2005/0215685 A1 | 9/2005 | Haines |
| 2005/0226489 A1 | 10/2005 | Beach et al. |
| 2005/0228112 A1 | 10/2005 | Takahashi et al. |
| 2005/0233135 A1 | 10/2005 | Iyer et al. |
| 2005/0287348 A1 | 12/2005 | Faler et al. |
| 2005/0287354 A1 | 12/2005 | Jennings et al. |
| 2006/0010620 A1 | 1/2006 | Krabbe et al. |
| 2006/0013463 A1 | 1/2006 | Ramsay et al. |
| 2006/0098853 A1 | 5/2006 | Roundhill et al. |
| 2006/0118408 A1 | 6/2006 | Myli et al. |
| 2006/0229407 A1 | 10/2006 | Vogel et al. |
| 2006/0251895 A1 | 11/2006 | Lambert et al. |
| 2007/0000545 A1 | 1/2007 | Cannon et al. |
| 2007/0016372 A1 | 1/2007 | Browne et al. |
| 2007/0032741 A1 | 2/2007 | Hibner et al. |
| 2007/0035561 A1 | 2/2007 | Bachelder et al. |
| 2007/0038083 A1 | 2/2007 | Srinivasan et al. |
| 2007/0051275 A1 | 3/2007 | Muller et al. |
| 2007/0087199 A1 | 4/2007 | Yoshimura et al. |
| 2007/0092738 A1 | 4/2007 | Groenlund et al. |
| 2007/0164117 A1 | 7/2007 | Swiler et al. |
| 2007/0218900 A1 | 9/2007 | Abhyanker |
| 2007/0249778 A1 | 10/2007 | Clemens et al. |
| 2007/0258147 A1 | 11/2007 | Van et al. |
| 2008/0075936 A1 | 3/2008 | McGurran et al. |
| 2008/0090207 A1 | 4/2008 | Rubbert |
| 2008/0102270 A1 | 5/2008 | Shiao et al. |
| 2008/0126030 A1 | 5/2008 | Jain et al. |
| 2008/0159591 A1 | 7/2008 | Ruedin |
| 2008/0166309 A1 | 7/2008 | McDermott et al. |
| 2008/0171145 A1 | 7/2008 | Stants et al. |
| 2008/0181252 A1 | 7/2008 | Rofougaran |
| 2008/0187708 A1 | 8/2008 | Decker et al. |
| 2008/0188610 A1 | 8/2008 | Polk et al. |
| 2008/0190319 A1 | 8/2008 | Reisacher et al. |
| 2008/0192233 A1 | 8/2008 | Rosania |
| 2008/0199721 A1 | 8/2008 | Scott et al. |
| 2008/0221439 A1 | 9/2008 | Iddan et al. |
| 2008/0267499 A1 | 10/2008 | Deischinger et al. |
| 2008/0293857 A1 | 11/2008 | Crawford et al. |
| 2008/0295737 A1 | 12/2008 | Henglein et al. |
| 2008/0300714 A1 | 12/2008 | Hughes et al. |
| 2008/0319089 A1 | 12/2008 | Muller et al. |
| 2009/0012393 A1 | 1/2009 | Choi |
| 2009/0022998 A1 | 1/2009 | Toth et al. |
| 2009/0042020 A1 | 2/2009 | Ferencz et al. |
| 2009/0068473 A1 | 3/2009 | Van et al. |
| 2009/0092811 A1 | 4/2009 | Chasser et al. |
| 2009/0098476 A1 | 4/2009 | Denton et al. |
| 2009/0099626 A1 | 4/2009 | De et al. |
| 2009/0163785 A1 | 6/2009 | Nelson |
| 2009/0205643 A1 | 8/2009 | Tanaka et al. |
| 2009/0226673 A1 | 9/2009 | Friedersdorf et al. |
| 2009/0268946 A1 | 10/2009 | Zhang et al. |
| 2009/0306755 A1 | 12/2009 | Dickinson et al. |
| 2010/0022696 A1 | 1/2010 | Maruoka et al. |
| 2010/0047620 A1 | 2/2010 | Decker et al. |
| 2010/0076302 A1 | 3/2010 | Gray et al. |
| 2010/0110553 A1 | 5/2010 | Anderson et al. |
| 2010/0139855 A1 | 6/2010 | Edler et al. |
| 2010/0204357 A1 | 8/2010 | Chasser et al. |
| 2010/0204414 A1 | 8/2010 | Chasser et al. |
| 2010/0233461 A1 | 9/2010 | Wood et al. |
| 2010/0277786 A1 | 11/2010 | Anderson et al. |
| 2010/0302093 A1 | 12/2010 | Bunch et al. |
| 2010/0310734 A1 | 12/2010 | Groneberg-Nienstedt |
| 2010/0321758 A1 | 12/2010 | Bugno et al. |
| 2010/0329510 A1 | 12/2010 | Schmid |
| 2011/0027567 A1 | 2/2011 | Kekicheff et al. |
| 2011/0117025 A1 | 5/2011 | Dacosta et al. |
| 2011/0123788 A1 | 5/2011 | Viasnoff |
| 2011/0123792 A1 | 5/2011 | Niewold |
| 2011/0130659 A1 | 6/2011 | Cinquin et al. |
| 2011/0151163 A1 | 6/2011 | Bloom et al. |
| 2011/0159813 A1 | 6/2011 | Mallinson et al. |
| 2011/0159921 A1 | 6/2011 | Davis et al. |
| 2011/0194629 A1 | 8/2011 | Bekanich |
| 2011/0199674 A1 | 8/2011 | Melcher et al. |
| 2011/0236673 A1 | 9/2011 | Jennings et al. |
| 2011/0301466 A1 | 12/2011 | Wang et al. |
| 2012/0026459 A1 | 2/2012 | Tucker et al. |
| 2012/0053689 A1 | 3/2012 | Martin et al. |
| 2012/0064134 A1 | 3/2012 | Bourke et al. |
| 2012/0072188 A1 | 3/2012 | Maerten et al. |
| 2012/0107584 A1 | 5/2012 | Eibon et al. |
| 2012/0147319 A1 | 6/2012 | Corti et al. |
| 2012/0165671 A1 | 6/2012 | Hill et al. |
| 2012/0184846 A1 | 7/2012 | Izatt et al. |
| 2012/0229882 A1 | 9/2012 | Fish et al. |
| 2012/0270986 A1 | 10/2012 | Maruyama et al. |
| 2012/0308724 A1 | 12/2012 | Hellring et al. |
| 2013/0011662 A1 | 1/2013 | Clamer et al. |
| 2013/0048925 A1 | 2/2013 | Edwards et al. |
| 2013/0059164 A1 | 3/2013 | Hofmann et al. |
| 2013/0113763 A1 | 5/2013 | Nungester et al. |
| 2013/0161062 A1 | 6/2013 | Yamaoka et al. |
| 2013/0170013 A1 | 7/2013 | Tonar et al. |
| 2013/0172473 A1 | 7/2013 | Rathschlag et al. |
| 2013/0230477 A1 | 9/2013 | Li et al. |
| 2013/0307935 A1 | 11/2013 | Rappel et al. |
| 2013/0317351 A1 | 11/2013 | Case et al. |
| 2013/0317369 A1 | 11/2013 | Bryant-Greenwood et al. |
| 2013/0324310 A1 | 12/2013 | Leech et al. |
| 2013/0336525 A1 | 12/2013 | Kurtz et al. |
| 2014/0009275 A1 | 1/2014 | Bowers et al. |
| 2014/0072442 A1 | 3/2014 | Bowman et al. |

(56) References Cited

U.S. PATENT DOCUMENTS

| | | |
|---|---|---|
| 2014/0158950 A1 | 6/2014 | Helms et al. |
| 2014/0160904 A1 | 6/2014 | Decoux et al. |
| 2014/0171786 A1 | 6/2014 | Stagl |
| 2014/0249336 A1 | 9/2014 | Komatsu et al. |
| 2014/0255608 A1 | 9/2014 | Eibon et al. |
| 2014/0275341 A1 | 9/2014 | Edwards |
| 2015/0004424 A1 | 1/2015 | Kruesemann et al. |
| 2015/0010748 A1 | 1/2015 | Chen et al. |
| 2015/0024189 A1 | 1/2015 | Imaizumi et al. |
| 2015/0048286 A1 | 2/2015 | Nishio et al. |
| 2015/0069117 A1 | 3/2015 | Rapoport et al. |
| 2015/0080735 A1 | 3/2015 | Hyun et al. |
| 2015/0132477 A1 | 5/2015 | Seong et al. |
| 2015/0148679 A1 | 5/2015 | Thiele et al. |
| 2015/0247040 A1 | 9/2015 | Henglein et al. |
| 2015/0254515 A1 | 9/2015 | Zobel |
| 2015/0329054 A1 | 11/2015 | Neuman et al. |
| 2016/0101642 A1 | 4/2016 | Richert et al. |
| 2016/0108256 A1 | 4/2016 | Yang et al. |
| 2016/0160078 A1 | 6/2016 | Edwards |
| 2016/0178510 A1 | 6/2016 | Meulendijks-Kiggen et al. |
| 2016/0207344 A1 | 7/2016 | Klein et al. |
| 2016/0211464 A1 | 7/2016 | Tanabe et al. |
| 2016/0270656 A1 | 9/2016 | Samec et al. |
| 2016/0291134 A1 | 10/2016 | Droz et al. |
| 2016/0340545 A1 | 11/2016 | Edwards |
| 2016/0360970 A1 | 12/2016 | Tzvieli et al. |
| 2017/0068143 A1 | 3/2017 | Bruizeman et al. |
| 2017/0071577 A1 | 3/2017 | Seo et al. |
| 2017/0132855 A1 | 5/2017 | Kim et al. |
| 2017/0174893 A1 | 6/2017 | Fujita et al. |
| 2017/0192733 A1 | 7/2017 | Huang et al. |
| 2017/0251035 A1 | 8/2017 | Siminoff et al. |
| 2017/0253751 A1 | 9/2017 | Busbee et al. |
| 2017/0261830 A1 | 9/2017 | Luten et al. |
| 2017/0354398 A1 | 12/2017 | Martins |
| 2017/0360401 A1 | 12/2017 | Rothberg et al. |
| 2018/0056690 A1 | 3/2018 | Bollstroem et al. |
| 2018/0074238 A1 | 3/2018 | Yoon |
| 2018/0106015 A1 | 4/2018 | Pino et al. |
| 2018/0120435 A1 | 5/2018 | Decker et al. |
| 2018/0127617 A1 | 5/2018 | Kabagambe et al. |
| 2018/0149782 A1* | 5/2018 | Seubert .................. F21K 2/005 |
| 2018/0188026 A1 | 7/2018 | Zhang et al. |
| 2018/0189550 A1 | 7/2018 | McCombe et al. |
| 2018/0267382 A1 | 9/2018 | Kwon et al. |
| 2018/0329066 A1 | 11/2018 | Pacala |
| 2018/0370205 A1 | 12/2018 | Markowicz et al. |
| 2019/0015867 A1 | 1/2019 | Fujita et al. |
| 2019/0019411 A1 | 1/2019 | Sweeney et al. |
| 2019/0031889 A1 | 1/2019 | Fujita et al. |
| 2019/0072976 A1 | 3/2019 | Bell et al. |
| 2019/0096215 A1 | 3/2019 | Shahid et al. |
| 2019/0126923 A1 | 5/2019 | Taie et al. |
| 2019/0154831 A1 | 5/2019 | Decker et al. |
| 2019/0176439 A1 | 6/2019 | Hara et al. |
| 2019/0181613 A1 | 6/2019 | Kurosaka et al. |
| 2019/0211211 A1 | 7/2019 | Fujita et al. |
| 2020/0152084 A1 | 5/2020 | Kumar et al. |
| 2020/0216679 A1 | 7/2020 | Fang et al. |
| 2020/0225351 A1 | 7/2020 | Decker et al. |
| 2020/0233123 A1 | 7/2020 | Wheatley |
| 2020/0237326 A1 | 7/2020 | Achatz et al. |
| 2020/0247651 A1 | 8/2020 | Wang et al. |
| 2020/0269770 A1 | 8/2020 | Chang et al. |
| 2020/0301433 A1 | 9/2020 | Katayama et al. |
| 2020/0346640 A1 | 11/2020 | Chang et al. |
| 2020/0364462 A1 | 11/2020 | Imes |
| 2020/0406874 A1 | 12/2020 | Chang et al. |
| 2021/0003405 A1 | 1/2021 | Choi |
| 2021/0040329 A1 | 2/2021 | Decker et al. |
| 2021/0092969 A1 | 4/2021 | Hartwig et al. |
| 2021/0116563 A1 | 4/2021 | Decker et al. |
| 2021/0165099 A1 | 6/2021 | Porcel Magnusson |
| 2021/0215517 A1 | 7/2021 | Bensalem |
| 2021/0233408 A1 | 7/2021 | Swan |
| 2021/0243410 A1 | 8/2021 | Ekin |
| 2021/0261152 A1 | 8/2021 | Meijburg et al. |
| 2021/0316659 A1 | 10/2021 | Betz et al. |
| 2021/0327092 A1 | 10/2021 | Jiang et al. |
| 2022/0012555 A1 | 1/2022 | Duarte et al. |
| 2022/0101021 A1 | 3/2022 | Neubecker et al. |
| 2022/0108119 A1 | 4/2022 | Margines et al. |
| 2022/0114273 A1 | 4/2022 | Njemanze |
| 2022/0126873 A1 | 4/2022 | Alghanem et al. |
| 2022/0244740 A1 | 8/2022 | Jiang et al. |
| 2022/0325109 A1 | 10/2022 | Decker et al. |
| 2022/0374667 A1 | 11/2022 | Duarte et al. |
| 2023/0088934 A1 | 3/2023 | Decker et al. |
| 2023/0112815 A1 | 4/2023 | Fang et al. |
| 2023/0303855 A1 | 9/2023 | Kingsley et al. |
| 2023/0385586 A1 | 11/2023 | Duarte et al. |
| 2024/0295654 A1 | 9/2024 | Decker et al. |

FOREIGN PATENT DOCUMENTS

| | | |
|---|---|---|
| AU | 2003303513 A1 | 7/2004 |
| AU | 2003297905 A1 | 7/2005 |
| AU | 2020101520 A4 | 9/2020 |
| BR | 7909035 A | 8/1981 |
| BR | PI9408412 A | 8/1997 |
| BR | 102013017136 A2 | 3/2016 |
| CA | 438037 A | 11/1946 |
| CA | 1059316 A | 7/1979 |
| CA | 2178837 A1 | 6/1995 |
| CA | 2511486 A1 | 7/2004 |
| CA | 2773045 A1 | 3/2011 |
| CA | 2906844 A1 | 9/2014 |
| CN | 1173522 A | 2/1998 |
| CN | 302436842 S | 5/2003 |
| CN | 1681894 A | 10/2005 |
| CN | 1756571 A | 4/2006 |
| CN | 100385337 C | 4/2008 |
| CN | 101249045 A | 8/2008 |
| CN | 101525502 A | 9/2009 |
| CN | 101633801 A | 1/2010 |
| CN | 101681440 A | 3/2010 |
| CN | 101975951 A | 2/2011 |
| CN | 301490354 | 3/2011 |
| CN | 301582476 S | 6/2011 |
| CN | 301591040 S | 6/2011 |
| CN | 301591041 S | 6/2011 |
| CN | 301591057 | 6/2011 |
| CN | 102127361 A | 7/2011 |
| CN | 301607136 S | 7/2011 |
| CN | 301607202 S | 7/2011 |
| CN | 301607268 S | 7/2011 |
| CN | 301607293 S | 7/2011 |
| CN | 301624626 S | 7/2011 |
| CN | 301626792 S | 7/2011 |
| CN | 301626804 S | 7/2011 |
| CN | 102164997 A | 8/2011 |
| CN | 301635108 S | 8/2011 |
| CN | 301635265 S | 8/2011 |
| CN | 301642258 S | 8/2011 |
| CN | 301642349 S | 8/2011 |
| CN | 301648454 S | 8/2011 |
| CN | 301648583 S | 8/2011 |
| CN | 301655404 S | 8/2011 |
| CN | 301655434 S | 8/2011 |
| CN | 301655473 S | 8/2011 |
| CN | 301661475 S | 8/2011 |
| CN | 301666323 S | 9/2011 |
| CN | 301666360 S | 9/2011 |
| CN | 301666390 S | 9/2011 |
| CN | 301666429 S | 9/2011 |
| CN | 301673088 S | 9/2011 |
| CN | 301673113 S | 9/2011 |
| CN | 301695310 S | 10/2011 |
| CN | 301695338 S | 10/2011 |
| CN | 301709720 S | 10/2011 |
| CN | 301721695 S | 11/2011 |
| CN | 301825307 S | 2/2012 |
| CN | 301832877 S | 2/2012 |

(56) References Cited

FOREIGN PATENT DOCUMENTS

| | | |
|---|---|---|
| CN | 301841121 S | 2/2012 |
| CN | 301841174 S | 2/2012 |
| CN | 301847111 S | 2/2012 |
| CN | 301862097 S | 3/2012 |
| CN | 301862142 | 3/2012 |
| CN | 301873396 S | 3/2012 |
| CN | 301890128 S | 4/2012 |
| CN | 301891840 S | 4/2012 |
| CN | 301891891 S | 4/2012 |
| CN | 301891897 S | 4/2012 |
| CN | 301903048 S | 5/2012 |
| CN | 301903124 S | 5/2012 |
| CN | 301916038 S | 5/2012 |
| CN | 301916052 S | 5/2012 |
| CN | 301923513 S | 5/2012 |
| CN | 301925873 S | 5/2012 |
| CN | 301925874 S | 5/2012 |
| CN | 301941663 S | 5/2012 |
| CN | 301941741 S | 5/2012 |
| CN | 301941749 S | 5/2012 |
| CN | 301941750 S | 5/2012 |
| CN | 301941751 S | 5/2012 |
| CN | 301941770 S | 5/2012 |
| CN | 301941839 S | 5/2012 |
| CN | 301941903 S | 5/2012 |
| CN | 301941955 S | 5/2012 |
| CN | 301941957 S | 5/2012 |
| CN | 301949321 S | 6/2012 |
| CN | 301949365 S | 6/2012 |
| CN | 301949399 S | 6/2012 |
| CN | 301959970 S | 6/2012 |
| CN | 301960091 S | 6/2012 |
| CN | 301968928 S | 6/2012 |
| CN | 301968962 S | 6/2012 |
| CN | 301968967 S | 6/2012 |
| CN | 301969094 S | 6/2012 |
| CN | 301969120 S | 6/2012 |
| CN | 301969149 S | 6/2012 |
| CN | 301969150 S | 6/2012 |
| CN | 301969152 S | 6/2012 |
| CN | 301978685 S | 7/2012 |
| CN | 301978687 S | 7/2012 |
| CN | 301978699 S | 7/2012 |
| CN | 301978700 S | 7/2012 |
| CN | 301978726 S | 7/2012 |
| CN | 301978812 S | 7/2012 |
| CN | 302000544 S | 7/2012 |
| CN | 302000671 S | 7/2012 |
| CN | 302000695 S | 7/2012 |
| CN | 302000698 S | 7/2012 |
| CN | 302000701 S | 7/2012 |
| CN | 302000768 S | 7/2012 |
| CN | 302000772 S | 7/2012 |
| CN | 302000774 S | 7/2012 |
| CN | 302000872 S | 7/2012 |
| CN | 302000873 S | 7/2012 |
| CN | 302000874 S | 7/2012 |
| CN | 302000924 S | 7/2012 |
| CN | 302000979 S | 7/2012 |
| CN | 302011969 S | 7/2012 |
| CN | 302012100 S | 7/2012 |
| CN | 302030028 S | 8/2012 |
| CN | 302031957 S | 8/2012 |
| CN | 302031986 S | 8/2012 |
| CN | 302032176 S | 8/2012 |
| CN | 302035638 S | 8/2012 |
| CN | 302045389 S | 8/2012 |
| CN | 302045468 S | 8/2012 |
| CN | 102675917 A | 9/2012 |
| CN | 302065225 S | 9/2012 |
| CN | 302065283 S | 9/2012 |
| CN | 302093519 S | 9/2012 |
| CN | 102712821 A | 10/2012 |
| CN | 302112909 S | 10/2012 |
| CN | 302112939 S | 10/2012 |
| CN | 302133529 S | 10/2012 |
| CN | 302144445 S | 10/2012 |
| CN | 302144446 S | 10/2012 |
| CN | 302166516 S | 11/2012 |
| CN | 302222318 S | 12/2012 |
| CN | 302233616 S | 12/2012 |
| CN | 302256458 S | 12/2012 |
| CN | 302256526 S | 12/2012 |
| CN | 302270149 S | 1/2013 |
| CN | 302270177 S | 1/2013 |
| CN | 302270201 S | 1/2013 |
| CN | 302281104 S | 1/2013 |
| CN | 302281235 S | 1/2013 |
| CN | 302281254 S | 1/2013 |
| CN | 302291573 S | 1/2013 |
| CN | 302291660 S | 1/2013 |
| CN | 302301060 S | 1/2013 |
| CN | 302301062 S | 1/2013 |
| CN | 302301085 S | 1/2013 |
| CN | 302301086 S | 1/2013 |
| CN | 302334400 S | 2/2013 |
| CN | 102964469 A | 3/2013 |
| CN | 302342829 S | 3/2013 |
| CN | 302363188 S | 3/2013 |
| CN | 302374231 S | 3/2013 |
| CN | 302374268 S | 3/2013 |
| CN | 302374288 S | 3/2013 |
| CN | 302374289 S | 3/2013 |
| CN | 302374290 S | 3/2013 |
| CN | 302384814 S | 4/2013 |
| CN | 302384902 S | 4/2013 |
| CN | 302394704 S | 4/2013 |
| CN | 302416729 S | 4/2013 |
| CN | 302416821 S | 4/2013 |
| CN | 302416830 S | 4/2013 |
| CN | 302416838 S | 4/2013 |
| CN | 302416846 S | 4/2013 |
| CN | 302416849 S | 4/2013 |
| CN | 302436843 S | 5/2013 |
| CN | 302436844 S | 5/2013 |
| CN | 302436903 S | 5/2013 |
| CN | 302436915 S | 5/2013 |
| CN | 302436930 S | 5/2013 |
| CN | 302441983 S | 5/2013 |
| CN | 302458116 S | 6/2013 |
| CN | 302469967 S | 6/2013 |
| CN | 302477494 S | 6/2013 |
| CN | 103221491 A | 7/2013 |
| CN | 302505773 S | 7/2013 |
| CN | 302511866 S | 7/2013 |
| CN | 302696254 S | 12/2013 |
| CN | 302721977 | 1/2014 |
| CN | 203424965 U | 2/2014 |
| CN | 103649239 A | 3/2014 |
| CN | 302925540 S | 8/2014 |
| CN | 302954351 S | 10/2014 |
| CN | 104212286 A | 12/2014 |
| CN | 303051440 S | 12/2014 |
| CN | 303113025 S | 2/2015 |
| CN | 104693704 A | 6/2015 |
| CN | 104789101 A | 7/2015 |
| CN | 303310734 S | 7/2015 |
| CN | 105164175 A | 12/2015 |
| CN | 204899530 U | 12/2015 |
| CN | 303511001 S | 12/2015 |
| CN | 105246991 A | 1/2016 |
| CN | 303586581 S | 2/2016 |
| CN | 303606842 S | 3/2016 |
| CN | 303623760 S | 3/2016 |
| CN | 205433734 U | 8/2016 |
| CN | 205541424 U | 8/2016 |
| CN | 106084962 A | 11/2016 |
| CN | 106619891 A | 5/2017 |
| CN | 206236172 U | 6/2017 |
| CN | 304157728 S | 6/2017 |
| CN | 106926830 A | 7/2017 |
| CN | 107124613 A | 9/2017 |
| CN | 304275911 S | 9/2017 |
| CN | 304328781 S | 10/2017 |

(56) References Cited

FOREIGN PATENT DOCUMENTS

| | | |
|---|---|---|
| CN | 304334069 S | 10/2017 |
| CN | 107383573 A | 11/2017 |
| CN | 304355021 S | 11/2017 |
| CN | 304355040 S | 11/2017 |
| CN | 304456286 S | 1/2018 |
| CN | 304525850 S | 3/2018 |
| CN | 304572439 S | 4/2018 |
| CN | 108116334 A | 6/2018 |
| CN | 304830464 S | 9/2018 |
| CN | 108656783 A | 10/2018 |
| CN | 108896021 A | 11/2018 |
| CN | 109384257 A | 2/2019 |
| CN | 109679412 A | 4/2019 |
| CN | 305126450 S | 4/2019 |
| CN | 305167208 S | 5/2019 |
| CN | 305190233 S | 5/2019 |
| CN | 109945973 A | 6/2019 |
| CN | 305287504 S | 8/2019 |
| CN | 305422145 S | 11/2019 |
| CN | 305486959 S | 12/2019 |
| CN | 110696170 A | 1/2020 |
| CN | 110705485 A | 1/2020 |
| CN | 305646550 S | 3/2020 |
| CN | 111402194 A | 7/2020 |
| CN | 305906704 S | 7/2020 |
| CN | 306025411 S | 9/2020 |
| CN | 306025413 S | 9/2020 |
| CN | 306304265 S | 1/2021 |
| CN | 306425203 S | 3/2021 |
| CN | 112656580 A | 4/2021 |
| CN | 112785724 A | 5/2021 |
| CN | 306514827 S | 5/2021 |
| CN | 306534437 S | 5/2021 |
| CN | 113030952 A | 6/2021 |
| CN | 306614703 S | 6/2021 |
| CN | 306848937 S | 9/2021 |
| CN | 306944385 | 11/2021 |
| CN | 306980688 S | 12/2021 |
| CN | 307021142 S | 12/2021 |
| CN | 307021176 S | 12/2021 |
| CN | 307096360 S | 2/2022 |
| CN | 307137411 S | 3/2022 |
| CN | 307161678 S | 3/2022 |
| CN | 307283309 S | 4/2022 |
| CN | 114566276 A | 5/2022 |
| CN | 307429088 S | 7/2022 |
| CN | 307429089 S | 7/2022 |
| CN | 307429090 S | 7/2022 |
| CN | 307441509 S | 7/2022 |
| CN | 307441510 S | 7/2022 |
| CN | 307444047 S | 7/2022 |
| CN | 307527862 S | 9/2022 |
| CN | 307615331 S | 10/2022 |
| CN | 115956105 A | 4/2023 |
| DE | 2315259 A1 | 10/1973 |
| DE | 2222871 A1 | 11/1973 |
| DE | 3339571 A1 | 5/1985 |
| DE | 3803893 A1 | 8/1989 |
| DE | 19630813 A1 | 3/1997 |
| DE | 19716672 C1 | 6/1998 |
| DE | 19739262 A1 | 3/1999 |
| DE | 19739263 A1 | 3/1999 |
| DE | 19834194 A1 | 2/2000 |
| DE | 10306576 A1 | 8/2004 |
| DE | 10343704 A1 | 4/2005 |
| DE | 202004016363 U1 | 3/2006 |
| DE | 102005061684 A1 | 6/2007 |
| DE | 202007007421 U1 | 8/2007 |
| DE | 102007062945 A1 | 6/2009 |
| DE | 102008059867 A1 | 3/2010 |
| DE | 102010029169 A1 | 11/2011 |
| DE | 202013006851 U1 | 9/2013 |
| EP | 0046746 A1 | 3/1982 |
| EP | 0552047 A1 | 7/1993 |
| EP | 0736073 A1 | 10/1996 |
| EP | 0813911 A2 | 12/1997 |
| EP | 0869158 A2 | 10/1998 |
| EP | 0992965 A2 | 4/2000 |
| EP | 1284278 A2 | 2/2003 |
| EP | 1047960 B1 | 7/2003 |
| EP | 1583561 A2 | 10/2005 |
| EP | 1938864 A1 | 7/2008 |
| EP | 2756042 A1 | 7/2014 |
| EP | 2783921 A1 | 10/2014 |
| EP | 2947630 A1 | 11/2015 |
| EP | 2970712 A1 | 1/2016 |
| EP | 3239251 A1 | 11/2017 |
| EP | 1499567 B1 | 4/2018 |
| EP | 2798022 B1 | 4/2018 |
| EP | 3578611 A1 | 12/2019 |
| EP | 3827285 A1 | 6/2021 |
| EP | 3842292 A1 | 6/2021 |
| ES | 2116720 T3 | 7/1998 |
| FR | 1523766 A | 5/1968 |
| FR | 2775860 A1 | 9/1999 |
| GB | 0661245 A | 11/1951 |
| GB | 0729546 A | 5/1955 |
| GB | 0821583 A | 10/1959 |
| IN | 307274 | 2/2019 |
| JP | 56-501277 A | 9/1981 |
| JP | 6044027 B2 | 10/1985 |
| JP | 61-074679 A | 4/1986 |
| JP | 63-048674 A | 3/1988 |
| JP | 03-023224 A | 1/1991 |
| JP | 04-083255 A | 3/1992 |
| JP | 09-507089 A | 7/1997 |
| JP | 09-234982 A | 9/1997 |
| JP | 09-269575 A | 10/1997 |
| JP | 09-323064 A | 12/1997 |
| JP | 2001-290429 A | 10/2001 |
| JP | 2002-060698 A | 2/2002 |
| JP | 2002-071911 A | 3/2002 |
| JP | 2002-177872 A | 6/2002 |
| JP | 2002-205006 A | 7/2002 |
| JP | 2002-205007 A | 7/2002 |
| JP | 2004-016568 A | 1/2004 |
| JP | 3527329 B2 | 5/2004 |
| JP | 2004-174469 A | 6/2004 |
| JP | 2004-244516 A | 9/2004 |
| JP | 2005-076019 A | 3/2005 |
| JP | 2005-090204 A | 4/2005 |
| JP | 2005-097462 A | 4/2005 |
| JP | 3107864 U | 4/2005 |
| JP | 2005-523981 A | 8/2005 |
| JP | 2006-008874 A | 1/2006 |
| JP | 3731831 B2 | 1/2006 |
| JP | 3798038 B2 | 7/2006 |
| JP | 2006-519766 A | 8/2006 |
| JP | 2007-332223 A | 12/2007 |
| JP | 4156948 B2 | 9/2008 |
| JP | 2009-102626 A | 5/2009 |
| JP | 2009-114468 A | 5/2009 |
| JP | 2010-173217 A | 8/2010 |
| JP | 2011-026543 A | 2/2011 |
| JP | 3165729 U | 2/2011 |
| JP | 2011-225652 A | 11/2011 |
| JP | 2012-036331 A | 2/2012 |
| JP | 5205062 B2 | 6/2013 |
| JP | 2014-210856 A | 11/2014 |
| JP | 2014-530233 A | 11/2014 |
| JP | 2015-093434 A | 5/2015 |
| JP | 5744720 B2 | 7/2015 |
| JP | 2016-518475 A | 6/2016 |
| JP | 2016-531441 A | 10/2016 |
| JP | 2016-200626 A | 12/2016 |
| JP | 6064869 B2 | 1/2017 |
| JP | 2017-138110 A | 8/2017 |
| JP | 6181984 B2 | 8/2017 |
| JP | 2017-211744 A | 11/2017 |
| JP | 2017-220585 A | 12/2017 |
| JP | 6323932 B2 | 5/2018 |
| JP | 6542217 B2 | 7/2019 |
| KR | 10-1999-0072923 A | 9/1999 |
| KR | 10-2000-0067910 A | 11/2000 |

(56) References Cited

FOREIGN PATENT DOCUMENTS

| | | |
|---|---|---|
| KR | 10-0294304 B1 | 9/2001 |
| KR | 10-2003-0064755 A | 8/2003 |
| KR | 10-2003-0064756 A | 8/2003 |
| KR | 10-2005-0106055 A | 11/2005 |
| KR | 10-0545438 B1 | 1/2006 |
| KR | 10-2006-0015276 A | 2/2006 |
| KR | 10-0562607 B1 | 3/2006 |
| KR | 10-0791959 B1 | 1/2008 |
| KR | 10-2008-0035811 A | 4/2008 |
| KR | 10-2008-0059259 A | 6/2008 |
| KR | 10-2008-0067700 A | 7/2008 |
| KR | 10-0863828 B1 | 10/2008 |
| KR | 10-2009-0008219 A | 1/2009 |
| KR | 10-2009-0009736 A | 1/2009 |
| KR | 10-0887788 B1 | 3/2009 |
| KR | 10-0933526 B1 | 12/2009 |
| KR | 10-1111420 B1 | 2/2012 |
| KR | 10-1114272 B1 | 3/2012 |
| KR | 10-2013-0039336 A | 4/2013 |
| KR | 10-2013-0062944 A | 6/2013 |
| KR | 10-2013-0088987 A | 8/2013 |
| KR | 10-2013-0105607 A | 9/2013 |
| KR | 10-2013-0128431 A | 11/2013 |
| KR | 10-2014-0037772 A | 3/2014 |
| KR | 10-1410145 B1 | 6/2014 |
| KR | 10-1444604 B1 | 9/2014 |
| KR | 10-2015-0119137 A | 10/2015 |
| KR | 10-2016-0034577 A | 3/2016 |
| KR | 10-2018-0101128 A | 9/2018 |
| KR | 10-1931272 B1 | 12/2018 |
| MX | 2007016506 A | 10/2008 |
| MX | 2015013146 A | 5/2016 |
| RU | 2380085 C2 | 1/2010 |
| RU | 2487899 C2 | 7/2013 |
| RU | 2012104143 A | 8/2013 |
| RU | 2494838 C2 | 10/2013 |
| RU | 2016122271 A | 12/2017 |
| RU | 2662522 C2 | 7/2018 |
| SU | 1390205 A1 | 4/1988 |
| UA | 95546 U | 12/2014 |
| WO | 81/00972 A1 | 4/1981 |
| WO | 87/04952 A1 | 8/1987 |
| WO | 95/16069 A1 | 6/1995 |
| WO | 95/17475 A1 | 6/1995 |
| WO | 97/00295 A1 | 1/1997 |
| WO | 97/23573 A1 | 7/1997 |
| WO | 98/39915 A1 | 9/1998 |
| WO | 98/47949 A1 | 10/1998 |
| WO | 99/37410 A1 | 7/1999 |
| WO | 00/15351 A1 | 3/2000 |
| WO | 00/29210 A1 | 5/2000 |
| WO | 01/40329 A1 | 6/2001 |
| WO | 01/68540 A2 | 9/2001 |
| WO | 02/43881 A1 | 6/2002 |
| WO | 03/06299 A2 | 1/2003 |
| WO | 03/14228 A1 | 2/2003 |
| WO | 03/64540 A1 | 8/2003 |
| WO | 03/66743 A1 | 8/2003 |
| WO | 03/95385 A1 | 11/2003 |
| WO | 2004/000903 A1 | 12/2003 |
| WO | 2004/029159 A1 | 4/2004 |
| WO | 2004/033563 A2 | 4/2004 |
| WO | 2004/046251 A2 | 6/2004 |
| WO | 2004/050770 A1 | 6/2004 |
| WO | 2004/060405 A2 | 7/2004 |
| WO | 2004/071472 A1 | 8/2004 |
| WO | 2004/074382 A2 | 9/2004 |
| WO | 2004/075624 A2 | 9/2004 |
| WO | 2004/088707 A1 | 10/2004 |
| WO | 2005/060922 A1 | 7/2005 |
| WO | 2005/078023 A2 | 8/2005 |
| WO | 2006/009873 A1 | 1/2006 |
| WO | 2006/028130 A1 | 3/2006 |
| WO | 2006/029145 A2 | 3/2006 |
| WO | 2006/046117 A1 | 5/2006 |
| WO | 2006/099317 A2 | 9/2006 |
| WO | 2007/007521 A1 | 1/2007 |
| WO | 2008/064904 A1 | 6/2008 |
| WO | 2008/088605 A2 | 7/2008 |
| WO | 2008/097895 A2 | 8/2008 |
| WO | 2009/018074 A1 | 2/2009 |
| WO | 2009/044861 A1 | 4/2009 |
| WO | 2011/056564 A2 | 5/2011 |
| WO | 2011/058966 A1 | 5/2011 |
| WO | 2012/019081 A2 | 2/2012 |
| WO | 2012/061209 A1 | 5/2012 |
| WO | 2012/075369 A1 | 6/2012 |
| WO | 2012/083183 A2 | 6/2012 |
| WO | 2013/037928 A1 | 3/2013 |
| WO | 2013/127054 A1 | 9/2013 |
| WO | 2014/053932 A1 | 4/2014 |
| WO | 2014/093428 A2 | 6/2014 |
| WO | 2014/152722 A1 | 9/2014 |
| WO | 2014/153054 A1 | 9/2014 |
| WO | 2014/157645 A1 | 10/2014 |
| WO | 2015/008102 A1 | 1/2015 |
| WO | 2015/016716 A1 | 2/2015 |
| WO | 2015/132301 A1 | 9/2015 |
| WO | 2015/138676 A1 | 9/2015 |
| WO | 2015/192321 A1 | 12/2015 |
| WO | 2016/085992 A1 | 6/2016 |
| WO | 2016/170330 A1 | 10/2016 |
| WO | 2017/006314 A1 | 1/2017 |
| WO | 2017/011250 A1 | 1/2017 |
| WO | 2017/127708 A1 | 7/2017 |
| WO | 2018/005088 A1 | 1/2018 |
| WO | 2018/038645 A1 | 3/2018 |
| WO | 2018/081613 A1 | 5/2018 |
| WO | 2019/063341 A1 | 4/2019 |
| WO | 2019/065316 A1 | 4/2019 |
| WO | 2019/084534 A1 | 5/2019 |
| WO | 2019/155068 A1 | 8/2019 |
| WO | 2019/155072 A1 | 8/2019 |
| WO | 2020/095554 A1 | 5/2020 |
| WO | 2020/099151 A1 | 5/2020 |
| WO | 2020/208134 A1 | 10/2020 |
| WO | 2021/035660 A1 | 3/2021 |
| WO | 2021/069518 A1 | 4/2021 |
| WO | 2021/221334 A1 | 11/2021 |
| WO | 2022/207766 A1 | 10/2022 |
| WO | 2022/226395 A1 | 10/2022 |

OTHER PUBLICATIONS

Office Action received for Chinese Patent Application No. 201980074721.8, mailed on Apr. 22, 2023, 18 pages (10 pages of English Translation and 8 pages of Original Document).
Office Action received for Chinese Patent Application No. 202080008236.3, mailed on Dec. 1, 2022, 9 pages (5 pages of English Translation and 4 pages of Original Document).
Office Action received for Chinese Patent Application No. 202080057258.9, mailed on Apr. 8, 2023, 13 pages (7 pages of English Translation and 6 pages of Original Document).
Office Action received for Chinese Patent Application No. 202080057258.9, mailed on Jun. 24, 2022, 30 pages (19 pages of English Translation and 11 pages of Original Document).
Office Action received for Chinese Patent Application No. 202080057258.9, mailed on Sep. 19, 2023, 10 pages (4 pages of English Translation and 6 pages of Original Document).
Office Action received for European Patent Application No. 17804019.2, mailed on Apr. 22, 2024, 8 pages.
Office Action received for European Patent Application No. 19836176.8, mailed on Feb. 15, 2024, 5 pages.
Office Action received for European Patent Application No. 19836176.8, mailed on Jan. 23, 2023, 6 pages.
Office Action received for European Patent Application No. 19836176.8, mailed on May 31, 2022, 6 pages.
Office Action received for European Patent Application No. 20701664.3, mailed on Feb. 1, 2023, 7 pages.
Office Action received for European Patent Application No. 20701664.3, mailed on Jan. 17, 2024, 7 pages.

(56) References Cited

OTHER PUBLICATIONS

Office Action received for European Patent Application No. 20701664.3, mailed on Jun. 21, 2023, 6 pages.
Office Action received for European Patent Application No. 20701664.3, mailed on Jun. 1, 2022, 8 pages.
Office Action received for European Patent Application No. 20761404.1, mailed on Aug. 28, 2023, 3 pages.
Office Action received for European Patent Application No. 20761404.1, mailed on Feb. 15, 2023, 8 pages.
Office Action received for Indian Patent Application No. 202217006419, mailed on Oct. 31, 2023, 4 pages.
Office Action received for Korean Patent Application No. 10-2021-7017222, mailed on Jun. 14, 2024, 11 pages (7 pages of English Translation and 4 pages of Original Document).
Office Action received for Korean Patent Application No. 10-2021-7017222, mailed on Jan. 19, 2024, 13 pages (9 pages of English Translation and 4 pages of Original Document).
Office Action received for Mexico Patent Application No. MX/a/2021/005606, mailed on May 17, 2024, 3 pages.
Pp. 383 & 384 of ASTM E308-06, "Standard Practice for Computing the Colors of Objects by Using the CIE System", ASTM International, West Conshohocken, PA, 2006, www.astm.org.
Pfeiffer "Analysis and optimization of radomes for automotive radar sensors", Sep. 22, 2009, pp. 234.
Pfeiffer et al., "Inductive Compensation of High-Permittivity Coatings on Automobile Long-Range Radar Radomes", IEEE Transactions on Microwave Theory and Techniques, vol. 57, No. 11, Nov. 2009, pp. 2627-2632.
Restriction Requirement received for U.S. Appl. No. 16/240,899, mailed on Dec. 16, 2020, 9 pages.
Restriction Requirement received for U.S. Appl. No. 16/536,655, mailed on Aug. 24, 2021, 14 pages.
Sivaramakrishnan et al., "Carbon nanotube-coated surface acoustic wave sensor for carbon dioxide sensing", Sensors and Actuators B, vol. 132, 2008, pp. 296-304.
Suzuki E. M., "Infrared Spectra of U.S. Automobile Original Finishes (1998-2000). IX. Identification of Bismuth Oxychloride and Silver/White Mica Pearlescent Pigments Using Extended Range FT-IR Spectroscopy, XRF Spectrometry, and SEM/EDS Analysis*", J Forensic Sci, Sep. 2014, vol. 59, No. 5, 21 Pages.
Tanimoto et al., "A Note on the Examination of Silverpoint Drawings by Near-Infrared Reflectography", Studies in Conservation, vol. 54, 2009, pp. 106-116.
Weng., "Expressway Electromechanical System," China Communications Press, 2000, pp. 52-53.
US 10,997,750 A, 6/1914, Smith Thomas E (withdrawn)
"Delphi ESR Startup Guide", Version 2.3, Feb. 5, 2019, pp. 77.
Adachi et al., "Absorption and scaltering of near-infrared light by dispersed lanthanum hexaboride nanoparticles for solar control filters," J. Mater. Res. 2010, vol. 25, No. 3, pp. 510-521.
Bae et al., "Environmentally friendly orange pigments based on hexagonal perovskite-type compounds and their high NIR reflectivity", Dyes and Pigments, vol. 147, 2017, pp. 523-528.
Combined Chinese Office Action and Search Report dated Aug. 24, 2015 in Patent Application No. 201280044928.9 (with English language translation and English translation of categories of cited documents).
European Search Report dated Jan. 24, 2012 in European Patent Application No. 11 18 1548.6 Filed Sep. 16, 2011.
International Preliminary Report on Patentability received for PCT Patent Application No. PCT/IB2020/050068, mailed on Jul. 22, 2021, 10 pages.
International Preliminary Report on Patentability received for PCT Patent Application No. PCT/US17/58832, mailed on May 9, 2019, 8 pages.
International Preliminary Report on Patentability received for PCT Patent Application No. PCT/US2019/060897, mailed on May 18, 2021, 10 pages.
International Preliminary Report on Patentability received for PCT Patent Application No. PCT/US2020/045430, mailed on Feb. 17, 2022, 9 pages.
International Search Report and Written Opinion received for PCT Patent Application No. PCT/IB2020/050068, mailed on Mar. 24, 2020, 13 pages.
International Search Report and Written Opinion received for PCT Patent Application No. PCT/US17/58832, mailed on Jan. 25, 2018, 9 pages.
International Search Report and Written Opinion received for PCT Patent Application No. PCT/US2019/060897, mailed on Apr. 24, 2020, 13 pages.
International Search Report and Written Opinion received for PCT Patent Application No. PCT/US2020/045430, mailed on Nov. 16, 2020, 12 Pages.
International Search Report dated Nov. 20, 2012 in PCT/EP12/068025 Filed Sep. 14, 2012.
Japanese Office Action dated Jan. 10, 2017 in Patent Application No. 2014-530233 (English Translation only).
Japanese Office Action dated May 30, 2016 in Patent Application No. 2014-530233 (English translation only).
Kim et al., "The use of visible and near-infrared spectroscopy for the analysis of soil water repellency", European Journal of Soil Science, May 2014, vol. 65, pp. 360-368.
Leon et al., "Preliminary studies by visible and near-infrared reflectance spectroscopy of juvenile and adult olive (*Olea europaea* L.) leaves", Journal of the Science of Food and Agriculture, vol. 86, Issue 6, Apr. 30, 2006, pp. 999-1004.
Li. et al., "Laser Principle, Technology and Application," Harbin Industrial University Press, 2004, pp. 358-367.
Liu et al., "Preparation of multifunctional locomotive coatings", Xiandai Tuliao Yu Tuzhuang (2012), 15(9), 6-9 Coden: Xtytal; ISSN: 1007-9548.
Morisawa et al., "Monitoring of a Calcination Reaction of High Reflective Green-Black (HRGB) Pigments by Using Near-Infrared Electronic Spectroscopy: Calcination Temperature-Dependent Crystal Structural Changes of Their Components and Calibration of the Extent of the Reaction", Applied Spectroscopy, vol. 66, No. 6, 2012, pp. 665-672.
Non-Final Office Action received for U.S. Appl. No. 16/240,899, mailed on Apr. 1, 2021, 13 pages.
Non-Final Office Action received for U.S. Appl. No. 16/240,899, mailed on Nov. 29, 2021, 11 pages.
Non-Final Office Action received for U.S. Appl. No. 16/536,655, mailed on Dec. 14, 2021, 14 pages.
Non-Final Office Action received for U.S. Appl. No. 16/830,719, mailed on Jun. 26, 2020, 8 pages.
Non-Final Office Action received for U.S. Appl. No. 17/126,593, mailed on Jun. 27, 2022, 11 pages.
Non-Final Office Action received for U.S. Appl. No. 17/293,813, mailed on Dec. 16, 2021, 12 pages.
Non-Final Office Action received for U.S. Appl. No. 17/879,279, mailed on Dec. 6, 2022, 5 pages.
Notice of Allowance received for U.S. Appl. No. 16/240,899, mailed on Aug. 24, 2022, 2 pages.
Notice of Allowance received for U.S. Appl. No. 16/240,899, mailed on Jun. 30, 2022, 8 pages.
Notice of Allowance received for U.S. Appl. No. 16/240,899, mailed on Oct. 3, 2022, 8 pages.
Notice of Allowance received for U.S. Appl. No. 16/240,899, mailed on Sep. 9, 2022, 2 pages.
Notice of Allowance received for U.S. Appl. No. 16/830,719, mailed on Sep. 18, 2020, 8 pages.
Notice of Allowance received for U.S. Appl. No. 17/126,593, mailed on Apr. 19, 2023, 9 pages.
Notice of Allowance received for U.S. Appl. No. 17/126,593, mailed on Dec. 7, 2022, 9 pages.
Notice of Allowance received for U.S. Appl. No. 17/293,813, mailed on Aug. 31, 2022, 2 pages.
Notice of Allowance received for U.S. Appl. No. 17/293,813, mailed on May 11, 2022, 9 pages.
Notice of Allowance received for U.S. Appl. No. 17/879,279, mailed on Mar. 15, 2023, 8 pages.

(56) References Cited

OTHER PUBLICATIONS

Notice of Allowance received for U.S. Appl. No. 17/879,279, mailed on May 5, 2023, 9 pages.
Notice of Allowance received for U.S. Appl. No. 18/361,725, mailed on Mar. 26, 2024, 10 pages.
Office Action received for Australian Patent Application No. 2020327937, mailed on Aug. 28, 2023, 4 pages.
Office Action received for Australian Patent Application No. 2020327937, mailed on Feb. 24, 2023, 4 pages.
Office Action received for Canada Patent Application No. 3119767, mailed on Jul. 15, 2022, 3 pages.
Office Action received for Canadian Patent Application No. 3119767, mailed on Feb. 2, 2024, 4 pages.
Office Action received for Canadian Patent Application No. 3125519, mailed on Sep. 16, 2022, 3 pages.
Office Action received for Canadian Patent Application No. 3147210, mailed on Feb. 20, 2023, 5 pages.
Office Action received for Chinese Patent Application No. 201780066470.X, mailed on Apr. 28, 2023, 8 pages (4 pages of English Translation and 4 pages of Original Document).
Office Action received for Chinese Patent Application No. 201780066470.X, mailed on Jan. 30, 2024, 30 pages (7 pages of English Translation and 23 pages of Original Document).
Office Action received for Chinese Patent Application No. 201780066470.X, mailed on Nov. 13, 2023, 33 pages (11 pages of English Translation and 22 pages of Original Document).
Applicant admitted prior art, InData Systems, "Invisible and Fluorescing Bar Code Printing and Reading," http://uvreaders.com/documents/449.pdf, modified Feb. 17, 2011.
Opthentic Corporation, "Invisible Barcodes and QR-codes," https://opthentic.com/technology/invisible_barcodes_qr-codes, downloaded Mar. 10, 2022.

* cited by examiner

METHOD OF DETECTING A CONCEALED PATTERN

FIELD OF THE INVENTION

The present invention relates to a method for detecting a component including a concealed pattern, a system for detecting a component including a concealed pattern, and a component including a concealed pattern.

BACKGROUND OF THE INVENTION

Barcodes, QR codes, and other machine-readable codes are useful for product identification and information transfer. However, these machine-readable codes detract from the visual appearance of the product over which they are disposed. This, in turn, limits the usefulness of these machine-readable codes by limiting the areas over which the machine-readable code may be disposed over the product.

SUMMARY OF THE INVENTION

The present invention is directed to a method for detecting a component including a concealed pattern, including: detecting infrared electromagnetic radiation reflected or emitted by a component including a first pattern, the component including: a substrate; the first pattern disposed over at least a portion of the substrate; an optional primer layer disposed between at least a portion of the substrate and at least a portion of the first pattern; and a first visibly opaque layer including an infrared transparent pigment, the first visibly opaque layer disposed over at least a portion of the first pattern; and comparing the reflectivity and/or absorbance of infrared electromagnetic radiation by the first pattern at one wavelength to the reflectivity and/or absorbance by the primer layer and/or the substrate at the same wavelength.

The present invention is also directed to a system for detecting a component including a concealed pattern, including: (a) a first component including: a substrate; a first pattern disposed over at least a portion of the substrate; an optional primer layer disposed between at least a portion of the substrate and at least a portion of the first pattern; and a first visibly opaque layer including an infrared transparent pigment, the first visibly opaque layer disposed over at least a portion of the first pattern, where the reflectivity and/or absorbance of infrared electromagnetic radiation by the first pattern at one wavelength differs from the reflectivity and/or absorbance by the primer layer and/or the substrate at the same wavelength; and (b) a second component including an infrared detector that detects infrared electromagnetic radiation reflected or emitted from the first component.

The present invention is also directed to a component including a concealed pattern including: a substrate; a first pattern disposed over at least a portion of the substrate; a second pattern disposed over at least a portion of the substrate; an optional primer layer disposed between at least a portion of the substrate and at least a portion of the first pattern or the second pattern; and a first visibly opaque layer including an infrared transparent pigment, the first visibly opaque layer disposed over at least a portion of the first pattern and the second pattern, where the reflectivity and/or absorbance of infrared electromagnetic radiation by the first pattern at one wavelength differs from the reflectivity and/or absorbance by the second pattern at the same wavelength, and where the first pattern is disposed directly over a layer of the component, the layer including the substrate or a coating layer of the component and beneath the first visibly opaque layer; and the second pattern is disposed directly over a different layer of the component compared to the first pattern, and the second pattern is disposed beneath the first visibly opaque layer, where the reflectivity and/or absorbance of infrared electromagnetic radiation by the first pattern at one wavelength differs from the reflectivity and/or absorbance by the layer over which the first pattern is directly disposed, and where the reflectivity and/or absorbance of infrared electromagnetic radiation by the second pattern at one wavelength differs from the reflectivity and/or absorbance by the layer over which the second pattern is directly disposed.

DESCRIPTION OF THE INVENTION

Figure 1A:
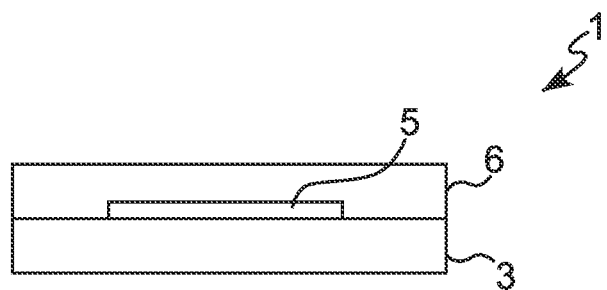
FIG. 1A shows a component including a concealed pattern.

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" pattern, "a" component, and the like refer to one or more of any of these items. Also, as used herein, the term "polymer" is meant to refer to prepolymers, oligomers, and both homopolymers and copolymers. The term "resin" is used interchangeably with "polymer".

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of the invention.

The present invention is directed to a component including a concealed pattern, the component comprising: a substrate; a pattern disposed over at least a portion of the substrate; an optional primer layer disposed between at least a portion of the substrate and at least a portion of the pattern; and a visibly opaque layer comprising an infrared transparent pigment, the visibly opaque layer disposed over at least a portion of the pattern, wherein the reflectivity and/or absorbance of infrared electromagnetic radiation by the pattern at one wavelength differs from the reflectivity and/or absorbance by the primer layer and/or the substrate at the same wavelength.

An opaque layer may be defined as one in which the ratio of $Y_{black}/Y_{white}$ (as described hereinafter) is at least 0.9, based on an average of this ratio over the portion of the electromagnetic spectrum over which the layer is being considered opaque. To determine whether a coating layer is visibly opaque, the coating may be drawn down over black and white opacity charts (BYK Leneta) using stainless steel rods wrapped with wire of varied diameter (from RD Specialties, Inc. (Webster, N.Y)). An integrating sphere spectrophotometer (X-rite Color i7) may be used to diffusely illuminate the sample and measure Y-value (reflectance). The ratio of $Y_{black}/Y_{white}$ may be determined by taking two Y measurements, one over the black side of the chart and one over the white side of the chart, for each wavelength in the visible region of the electromagnetic spectrum (400 nm to 700 nm). A coating is determined to be visibly opaque when the ratio of $Y_{black}/Y_{white}$ is at least 0.9, as averaged over the visible region of the electromagnetic spectrum. A coating is determined to be visibly transparent when the ratio of $Y_{black}/Y_{white}$ is less than 0.9, as averaged over the visible region of the electromagnetic spectrum. Similarly, a coating is determined to be transparent in the NIR range when the $Y_{black}/Y_{white}$ is less than 0.9, as averaged over the NIR region of the electromagnetic spectrum (700 nm to 2500 nm), and opaque in the NIR range when the $Y_{black}/Y_{white}$ is at least 0.9, as averaged over the NIR region of the electromagnetic spectrum (700 nm to 2500 nm). Such a designation of transparent or opaque can be similarly extended to other regions of the electromagnetic spectrum based on the average $Y_{black}/Y_{white}$ ratio over that region.

As used herein, the term "infrared radiation" or "IR radiation" or "infrared" or "IR" refers to electromagnetic radiation in the infrared range of the electromagnetic spectrum. Such IR radiation may have a wavelength from 700 nm to 1 mm. The IR radiation may be near-IR radiation. As used herein, the term "near-IR" or "near-infrared radiation" or "NIR" refers to electromagnetic radiation in the near-IR range of the electromagnetic spectrum. Such near-IR electromagnetic radiation may have a wavelength from 700 nm to 2500 nm, such as 1100 nm to 2500 nm, such as 900 nm to 1600 nm, such as 905 nm, or such as 1550 nm.

The pattern, the optional primer layer, and the visibly opaque layer of the component may be film-forming coating layers disposed over the substrate as described hereinafter formed by a coating composition coalescing to form the coating layers. The term "coalesced" refers to the process by which a coating composition hardens to form a coating. Coalescing may include the coating composition being cured (e.g., hardening by being crosslinked, either by itself or via a crosslinking agent) or the coating composition being dried. As used herein, the term "film-forming resin" may refer to a resin that can form a self-supporting continuous film on at least a horizontal surface of a substrate upon removal of any diluents or carriers present with the film-forming resin or upon curing at ambient or elevated temperature.

Film-forming resins that may be used in any of the coating layers disposed over the component may include, without limitation, those used in automotive OEM coating compositions, automotive refinish coating compositions, industrial coating compositions, architectural coating compositions, coil coating compositions, packaging coating compositions, protective and marine coating compositions, and aerospace coating compositions, among others.

Any of the film-forming resins disposed over the component may include a thermosetting film-forming resin. As used herein, the term "thermosetting" refers to resins that "set" irreversibly upon curing or crosslinking, where the polymer chains of the polymeric components are joined together by covalent bonds. This property is usually associated with a cross-linking reaction of the composition constituents, often induced, for example, by heat or radiation. Curing or crosslinking reactions also may be carried out under ambient conditions. Once cured or crosslinked, a thermoset resin will not melt upon the application of heat and is insoluble in conventional solvents. In other examples, the film-forming resin included within the coatings described herein may include a thermoplastic resin. As used herein, the term "thermoplastic" refers to resins that include polymeric components that can undergo liquid flow upon heating and are soluble in conventional solvents.

Any of the film-forming resins disposed over the component may include any of a variety of thermoplastic and/or thermosetting compositions known in the art. The film-forming resins may be deposited from water-based or solvent-based liquid compositions, or, alternatively, a composition in solid particulate form (e.g., a powder coating).

Thermosetting coating compositions typically include a crosslinking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing.

Thermosetting or curable coating compositions typically include film forming resins having functional groups that are reactive with the crosslinking agent. The film-forming resin in the coating layers described herein may be selected from any of a variety of polymers well-known in the art. The film-forming resin may be selected from, for example, acrylic polymers, polyester polymers, polyurethane polymers, polyamide polymers, polyether polymers, polysiloxane polymers, copolymers thereof, and mixtures thereof. Generally these polymers may be any polymers of these types made by any method known to those skilled in the art. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups), mercaptan groups, and combinations thereof.

Appropriate mixtures of film-forming resins may also be used in the preparation of the various coating layers described herein.

The substrate of the component over which the various coating layers are applied may be made of any suitable material. The substrate may be, for example, metallic or non-metallic. Metallic substrates may include tin, aluminum, steel, such as, tin-plated steel, chromium passivated steel, galvanized steel, or coiled steel, or other coiled metal, and any metallic alloys thereof. Non-metallic substrates may be polymeric, such as plastic, including polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) ("PET"), polycarbonate, polycarbonate acrylobutadiene styrene ("PC/ABS"), or polyamide. Other suitable non-metallic substrates may include wood, veneer, wood composite, particle board, plasterboard, medium density fiberboard, cement, concrete, stone, glass, ceramic, asphalt, paper, a filled or unfilled microporous membrane (e,g., TESLIN) and the like.

The substrate may be a pretreated metal substrate (such as is mentioned above) and may be coated with an electrodeposited coating. Suitable electrodepositable coating compositions have been described in U.S. Pat. No. 4,933,056 (Col. 2, l. 48 to Col. 13, l. 46), U.S. Pat. No. 5,530,043 (Col. 1, l. 46 to Col. 11, l. 25), U.S. Pat. No. 5,760,107 (Col. 2, l. 11 to Col. 24, l. 53), and U.S. Pat. No. 5,820,987 (Col. 3, l. 48 to Col. 17, l. 37), the specific sections of which are incorporated herein by reference. After the electrodeposited coating composition is cured, a primer-surfacer coating may be applied onto at least a portion of the electrodeposited coating. The primer-surfacer coating may be applied to the electrodeposited coating and cured prior to subsequent application of another coating. The primer-surfacer coating may be the optional primer layer described hereinafter.

The component comprising the substrate may be any component in which a concealed pattern, such as a machine-readable code, may be useful in determining information about that component. The component may include a vehicle component, such as a vehicle, a road, a road traffic safety product, signage, a building, a structure and any obstacle that may be located in a path of a moving vehicle. Road traffic safety products may include barriers, barricades, speed bumps, traffic cones, and the like. Vehicles may include any type of moving vehicle, such as automobiles, bicycles, trucks, buses, aircrafts, boats, and the like. The vehicle may be autonomously operated. The vehicle component may be clothing, such as clothing worn by an individual in the path of a vehicle. It is to be understood that vehicle components may include any component of the vehicle itself or any type of obstacles that may be located in the path of any of the types of vehicles (vehicle surroundings).

The component may include any surface that may be associated with a virtual reality/augmented reality environment (VR/AR). As used herein, "VR/AR" refers to a form of VR that layers virtual information over a live camera feed into a headset or through a computing device, giving the user the ability to view three-dimensional images. Therefore, it will be appreciated that a surface in a VR/AR environment may include any component captured in the live camera feed to form the VR/AR environment. For example, in a live video feed of a room in which the user is experiencing the VR/AR environment, the component may be any object contained in that room.

The component may include a package. A "package" is anything used to contain another item, particularly for shipping from a point of manufacture to a consumer, and often for subsequent storage by a consumer. The package may contain foodstuffs or non-foodstuffs. The component may include a label, which may include a material for attachment to an object in order to indicate data about that object, such as its manufacturer, nature, ownership, destination, or the like. The label may be a shipping label or a label positioned on a consumer product.

The component may include an identification component. The identification component may be an official document issued by an entity (e.g., the government, a business, an organization, and the like), to identify the individual to whom the official document was issued. The identification document may include identify a non-person component, such as a place or thing; non-limiting examples include tickets for an event (e.g., sporting event or concert), transportation tickets (e.g., plane ticket), or the like. The identification component may include a component bearing a unique identifier, such as a serial number associated therewith. Non-limiting examples of identification components include passports, a driver's license, a visa, a work identification badge, and the like.

The concealed pattern may be included as fiducial marker used in an imaging or sensing system as a marker or point of reference for the imaging or sensing system, such that the substrate is a substrate configured to include fiducial markers. The concealed pattern may serve as fiducial markers for tasks such as painting, taking photos, orientating cameras for detecting other concealed patterns, automatic parking applications, and other suitable scenarios.

The optional primer layer may include any of the previously-described film-forming resins and may be disposed over at least a portion of the substrate. The optional primer layer may be disposed between at least a portion of the substrate and at least a portion of the pattern (described hereinafter).

The pattern may be disposed over at least a portion of the substrate. The pattern may be disposed over at least a portion of the optional primer layer, if present in the coating system of the component. The pattern may include any of the previously-described film-forming resins. The pattern may be a coating layer disposed over at least a portion of the substrate and/or the optional primer layer, which may be selectively disposed thereover in the form of a pattern. The pattern may be a sticker disposed over at least a portion of the substrate and/or the optional primer layer. The pattern may be a mark made by a writing utensil, such as a pencil, a pen, a marker, and the like. The pattern may be applied to the substrate by 3D printing, screen printing, inkjet printing, and the like.

As used herein, the term "pattern" refers to a marking having any configuration. The pattern may include a unique identifier. The pattern may include a machine-readable code, and the machine-readable code may be a unique identifier corresponding to the component or an identifier that identifies the component. The machine-readable code may include a barcode, QR code, or any other type of machine-readable code known in the art that is used to represent data. The pattern may include a trademark or other tradename capable of identifying a source of the component. The pattern may include a machine-readable identifier and/or machine-readable instructions. The pattern may include any type of ornamental design. The pattern may include a picture or drawing. The pattern may include a temporal pattern, such as Morse code. The pattern may include a moving picture formed by an arrangement (e.g., a grid) of infrared sources (infrared LEDs) underneath the visibly opaque layer.

The pattern may include a surface deterioration formed on a surface of the substrate of the component or deterioration of any other coating layer of the component. Suitable examples of surface deterioration include a corroded area, a cracked area, a thermal or chemical degradation, a stress or strain, a deformation, and the like.

The component may include a plurality of patterns, such as a first pattern and a second pattern (and any other number of patterns) disposed over the substrate. The patterns may have the same configuration or a different configuration from each other. The patterns may be made of the same material or may be made of different materials. The patterns made of different materials may have a different reflectivity and/or absorbance or infrared electromagnetic radiation at certain wavelengths from one another, such that the reflectivity and/or absorbance of the first pattern differs from the reflectivity and/or absorbance of the second pattern at the same wavelength of infrared electromagnetic radiation. The first pattern may reflect or emit infrared electromagnetic radiation in the range of 800-1000 nm, while the second pattern reflects or emits infrared electromagnetic radiation in the range of 1600-2500 nm. Other combinations of wavelength ranges for the first and/or the second pattern within the infrared electromagnetic spectrum are contemplated.

The first and the second pattern may be directly disposed over the same layer of the component or directly over different layers of the component compared to each other. The layers of the component may include the substrate and any coating layer disposed over the substrate. The first pattern may be disposed directly over a first layer of the component (e.g., the substrate or other coating layer of the component) and beneath the visibly opaque layer, while the second pattern is disposed over a second layer of the component different from the first layer of the component, the second pattern also beneath the visibly opaque layer. As used herein, one layer being disposed "directly" over another layer means that the one layer is in direct contact with the other layer.

The reflectivity and/or the absorbance of infrared radiation by the pattern (or emission of radiation thereby) at one wavelength differs from the reflectivity and/or absorbance by the optional primer layer and/or the substrate at the same wavelength. This allows infrared radiation directed at the component from an infrared source (discussed hereinafter) to transmit through the visibly opaque layer having the infrared transparent pigment (discussed hereinafter) to the pattern and the substrate and/or the optional primer layer and have the infrared radiation reflected or absorbed differently off of the pattern compared to the substrate and/or the optional primer layer, so as to be distinguished by an infrared detector (described hereinafter) detecting infrared radiation reflected by the component. In this way, the infrared detector may identify the pattern, the orientation of the pattern, a condition of the pattern, and/or the distance to the pattern.

The pattern and/or the optional primer layer may include an infrared reflective pigment. An infrared reflective pigment may be included in the pattern and/or the optional primer layer, so long as the pattern may be distinguished from the optional primer layer by the infrared detector detecting infrared radiation reflected by the component. The pattern or optional primer layer may emit radiation at a predetermined wavelength.

As used herein, the term "infrared reflective pigment" may refer to a pigment or dye that, when included in a coating composition, provides a cured coating with a reflectance of infrared radiation greater than a cured coating deposited in the same manner from the same composition but without the infrared reflective pigment.

Suitable examples of infrared reflective pigments include thin flakes of metal or metal alloy infrared reflective pigments may include, for example, aluminum, chromium, cobalt, iron, copper, manganese, nickel, silver, gold, iron, tin, zinc, bronze, brass, including alloys thereof, such as zinc-copper alloys, zinc-tin alloys, and zinc-aluminum alloys, among others. Some specific examples include nickel antimony titanium, nickel niobium titanium, chrome antimony titanium, chrome niobium, chrome tungsten titanium, chrome iron nickel, chromium iron oxide, chromium oxide, chrome titanate, manganese antimony titanium, manganese ferrite, chromium green-black, cobalt titanates, chromites, or phosphates, cobalt magnesium, and aluminites, iron oxide, iron cobalt ferrite, iron titanium, zinc ferrite, zinc iron chromite, copper chromite, as well as combinations thereof.

In the present invention, such pigments may be in the form of thin flakes. For example, "leafing" aluminum flakes are often suitable. As used herein, the term "thin flake" means that a particle has a ratio of its width to its thickness (termed aspect ratio) that is at least 2 and often falls in the range of 10 to 2,000, such as 3 to 400, or, in some cases, 10 to 200, including 10 to 150. As such, a "thin flake" particle is one that has a substantially flat structure. Such flakes may have a coating deposited thereon, such as is the case with silica coated copper flakes.

Such thin flake particles may have a thickness of less than 0.05 μm to 10 μm, such as 0.5 to 5 μm. In certain examples, such thin flake particles have a maximum width of 10 to 150 μm, such as 10 to 30 μm.

The infrared reflective pigment may include thin flake particles having rounded edges and a smooth and flat surface, as opposed to jagged edges. Flakes having angular edges and uneven surfaces are known in the art as "cornflakes". On the other hand, flakes distinguished by more rounded edges and smoother, flatter surfaces are referred to as "silver dollar" flakes. Moreover, in certain examples, the thin flake metal or metal alloy particles having rounded edges may have a maximum width of no more than 25 μm, such as 10 to 15 μm, when measured according to ISO 1524.

Additional suitable thin flake metal or metal alloy infrared reflective pigments may include colored metallic pigments, such as those in which a coloring pigment is chemically adsorbed on the surface of a metallic pigment. Such colored metallic pigments are described in U.S. Pat. No. 5,037,745 at col. 2, line 55 to col. 7, line 54, the cited portion of which is incorporated herein by reference. Some such colored metallic pigments are also commercially available and include those available from U.S. Aluminum, Inc. (Flemington, N.J.) under the tradename FIREFLAKE. Infrared transparent pigments, such as the perylene-based pigments described below, may be chemically adsorbed on the surface of the metallic pigment, to provide a dark, sometimes black, colored infrared reflective metallic pigment.

The thin flake metal or metal alloy infrared reflective pigments may be present in the compositions of the pattern and/or of the optional primer layer in an amount of at least 1% by weight, such as at least 2%, at least 3%, at least 5%, at least 6%, or at least 10% by weight, based on the total solids weight of the composition. In some cases, the infrared reflective pigment can be present in the foregoing coating compositions in an amount of no more than 50% by weight, such as no more than 25%, or no more than 15% by weight, based on the total solids weight of the composition. A range of the amount of thin flake metal or metal alloy infrared reflective pigments present in such compositions may include any combinations of these values, inclusive of the recited values, such as 1-25%, 5-25%, or 10-15% by weight based on the total solids weight of the composition.

Suitable infrared reflective pigments may include infrared reflective pigments that are colored or essentially colorless, translucent or opaque. As used herein, the term "essentially colorless" means that the pigment does not have a color, e.g., the absorption curve for the pigment is devoid of absorption peaks in the 400-700 nm range and does not present a tint or hue in reflected or transmitted light when viewed under sunlight. A colored infrared reflective pigment may be an infrared reflective pigment that is not essentially colorless. Stated differently, a "colored" infrared reflective pigment is one that may be visibly-absorbing, as defined below. A "translucent" pigment means that visible light is able to pass through the pigment diffusely. An "opaque" pigment is one that scatters significant amounts of light. One example of an infrared reflective pigment that can be translucent and essentially colorless (if used in low amounts in a coating) is SOLARFLAIR 9870 pigment commercially available from Merck KGaA (Darmstadt, Germany). This commercially available pigment may also be an example of an interference pigment that has a mica substrate that is coated with titanium dioxide. As used in this application, the term "interference pigment" refers to a pigment having a multi-layer structure having alternating layers of material of different refractive indices.

Further examples of suitable colored and/or opaque infrared reflective pigments include, for example, any of a variety of metals and metal alloys, inorganic oxides, and interference pigments. Exemplary colors include, for example: white, as is the case with titanium dioxide; brown, as is the case with iron titanium brown spinel; green, as is the case with chromium oxide green; red, as is the case with iron oxide red; yellow, as is the case with chrome titanate yellow and nickel titanate yellow; and blue and violet, as is the case with certain TiO2 coated mica flakes.

Suitable inorganic oxide containing infrared reflective pigments include, for example, iron oxide, titanium oxide (TiO2) pigment, composite oxide system pigments, titanium oxide-coated mica pigment, iron oxide-coated mica pigment, and zinc oxide pigment, among many others. The inorganic oxide (e.g., TiO2) pigment may have an average particle size of from 1-5 μm, so as to reflect certain infrared radiation.

The infrared reflective pigment may include TiO2 having an average particle size of from 1-5 μm, silica having an average particle size of from 5-30 μm, CaCO3 having an average particle size of from 1-5 μm, and/or some combination thereof. The infrared reflective pigment may be included with an organic binder to form an infrared reflective coating composition. This infrared reflective coating composition may be used as the pattern and/or the optional primer layer.

The pattern and/or the optional primer layer may include an infrared opaque layer, which may include at least one of CaCO3 having an average particle size of from 0.3-5 μm, silica having an average particle size of from 1-30 μm, and TiO2 having an average particle size of from 0.1-5 μm. The infrared opaque layer may further include an infrared and/or visibly absorbing pigment (e.g., carbon black) and a binder.

The pattern and/or the optional primer layer may include an infrared fluorescent pigment and/or dye (hereinafter infrared fluorescent pigment). As used herein, the term "infrared fluorescent pigment" may refer to a pigment that can absorb electromagnetic radiation in the visible region (400 to 700 nm) and fluoresce in the infrared region. Examples of suitable infrared fluorescent pigments include metallic pigments, metal oxides, mixed metal oxides, metal sulfides, metal selenides, metal tellurides, metal silicates, inorganic oxides, inorganic silicates, alkaline earth metal silicates. As used herein, the term "alkaline" refers to the elements of group II of the periodic table Be, Mg, Ca, Sr, Ba, and Ra (beryllium, magnesium, calcium, strontium, barium, radium). Non-limiting examples of suitable infrared fluorescent pigments include metal compounds, which may be doped with one or more metals, metal oxides, alkali and/or rare earth elements. As used herein, the term "alkali" refers to the elements of group I of the periodic table Li, Na, K, Rb, Cs, and Fr (lithium, sodium, potassium, rubidium, cesium, francium). As used herein, the term "rare earth element" refers to the lanthanide series of elements La, Ce, Pr, Nd, Pm, Sm, Eu, Gd, Tb, Dy, Ho, Er, Tm, and Yb (lanthanum, cerium, praseodymium, neodymium, promethium, samarium, europium, gadolinium, terbium, dysprosium, holmium, erbium, thulium, and ytterbium).

More particularly, examples of infrared fluorescent pigments may include Egyptian blue (CaCuSi4O10), Han blue (BaCuSi4O10), Han purple (BaCuSi2O6), SrCuSi4O10, Ruby (Al2O3:Cr). In particular, blue alkali earth copper silicates, such as Egyptian blue (CaCuSi4O10) fluoresce in the 800 to 1200 nm region. Cadmium pigments, CdSe and CdTe compounds, "zirconia" red (red cadmium pigments coated with a zirconium silicate glass), indigo, blue verditer (2CuCO3·Cu(OH)2), copper blue, azurite (Cu3(CO3)2(OH)2), Ploss blue ((CuCa)(CH3COO)2·2H2O), and smalt (CoO·K·Si) may possess fluorescence.

Other examples of infrared fluorescent pigments may include ZnO, ZnS, ZnSe, and ZnTe, which have energy gaps that may be too large for band-to-band emission of infrared energy, but doping with Sn, Mn, and Te may lead to suitable impurity luminescence. Other examples of infrared fluorescent pigments may include compounds used in lighting and for fluorescent displays; certain direct bandgap semiconductors, such as (Al,Ga)As, InP, and the like; and materials used for solid state lasers, such as Nd doped yttrium aluminum garnet, and titanium doped sapphire. In addition, examples of infrared fluorescent pigments may include phosphors that emit in the deep red or infrared (e.g., LiAlO2:Fe, CaS:Yb).

The infrared fluorescent pigment may be an organic pigment or dye. Examples of suitable infrared fluorescent organic pigments include, spiro[indeno[1,2-b]chromene-10,1'-isobenzofuran]-3'-ones, 7-(dialkylamino)-3'H,11H-spiro[indeno[1,2-b]chromene-10,1'-isobenzofuran]-3'-ones, changsha (CS1-6) infrared fluorophores, thienopyrazines, rhodamines, such as aminobenzofuran-fused rhodamine dyes (AFR dyes) containing amino groups, sulforhodamine dyes, perylenediimide or hexarylenediimides, donor-acceptor charge transfer compounds such as substituted thiophenes, diphenylbenzobisthiadiazoles, and selenium or tellurium substituted derivatives, cyclic polyenes, cyclic polyene-ynes, perylenes, perylenebis(dicarboximide)s such as perylene bis(phenethylimide, or perylene bis(2,5-di-tert-butylphenylimide), perylene diimides containing nitrogen donor groups, polymethines, borondipyrromethenes, pyrrolopyrrole cyanines, squaraine dyes, tetrathiafulvalene, thiadiazole fused chromophores, phthalocyanine and porphyrin derivatives, metalloporphyrins, BODIPY (borondipyrromethane) dyes, tricarbocyanines, rubrenes, carbon nanotubes, and graphene and graphene oxide.

The infrared fluorescent organic pigment may be encapsulated as nanoparticles in polymers such as amphiphilic block copolymer. For example, an amphiphilic block copolymer encapsulating infrared fluorescent organic pigment nanoparticles may be poly(caprolactone)-b-poly-(ethylene glycol) (PCL-b-PEG). Furthermore, the infrared fluorescent organic pigment may be covalently bonded to the polymer matrix of the encapsulating polymer. In addition, the infrared fluorescent organic pigment may be anchored to a polymeric or inorganic particle.

The component may include a pattern including an infrared reflective pigment and may include the optional primer layer, which is substantially free of any infrared reflective pigment. For example, the pattern may include TiO2 as an infrared reflective pigment, while the optional primer layer is substantially free of TiO2 or other such infrared reflective pigment; the optional primer layer may include carbon black (an infrared absorbing pigment), for instance. It will be appreciated that while TiO2 functions as an infrared reflective pigment at certain wavelengths in the infrared electromagnetic spectrum, it functions as an infrared transparent pigment at certain other wavelengths in the infrared electromagnetic spectrum.

The component may include the optional primer layer including an infrared reflective pigment and a pattern substantially free of any infrared reflective pigment. For example, the optional primer layer may include TiO2 as an infrared reflective pigment, while the pattern is substantially free of TiO2 or other such infrared reflective or absorbing pigment.

The visibly opaque layer may include an infrared transparent pigment and/or dye (hereinafter, infrared transparent pigment). As used herein, the term "infrared transparent pigment" may refer to a pigment that is substantially transparent in the infrared range (700 nm to 1 mm), such as the near-IR range (700 to 2500 nm), such as is described in U.S. Patent Application Publication No. 2004/0191540 at [0020]-[0026], the cited portion of which is incorporated herein by reference, without appreciable scattering or absorption of radiation in such wavelengths. In certain examples, the infrared transparent pigment may have an average transmission of at least 70% in the infrared wavelength region. The infrared transparent pigment may be visibly absorbing. As used herein, the term "visibly-absorbing" refers to a pigment that substantially absorbs radiation in at least some wavelengths within the visible region of 400 to 700 nm.

Non-limiting examples of suitable infrared transparent pigments may include, for example, copper phthalocyanine pigment, halogenated copper phthalocyanine pigment, anthraquinone pigment, quinacridone pigment, perylene pigment, monoazo pigment, disazo pigment, quinophthalone pigment, indanthrone pigment, dioxazine pigment, isoindoline pigment, diarylide yellow pigment, brominated anthranthrone pigment, azo metal complex pigment, and the like. Combinations of the infrared transparent pigments may be used.

The infrared transparent pigment may include an infrared transparent black pigment, such as those that rely in part upon a perylene type structure that is illustrated below:

Commercially available examples of such pigments include PALIOGEN Black EH 0788, PALIOGEN Black L0086, and PALIOGEN Black S0084, commercially available from BASF Corporation (Ludwigshafen, Germany). Further examples of infrared transparent black pigments that are suitable for use in certain embodiments of the present invention are described in U.S. Patent Application Publication No. 2009/0098476 at [0030] to [0034], the cited portion of which is incorporated by reference herein, and includes those having a perylene isoindolene structure, an azomethine structure, and/or an aniline structure.

The visibly opaque layer, may be substantially free, or, in some cases, completely free, of infrared reflective or absorbing pigment, such as carbon black. As used in this application, the term "substantially free", when used with reference to the amount of infrared reflective or absorbing pigment in the visibly opaque layer, means that infrared reflective or absorbing pigment is present in the composition in an amount of no more than 0.1% by weight, no more than 0.05% by weight, or no more than 0.02% by weight, based on the total solids weight of the composition. As used herein, the term "completely free", when used with reference to the amount of infrared reflective or absorbing pigment in a coating composition, means that infrared reflective or absorbing pigment is not intentionally present in the composition at all, such as no more than 0.01% by weight or 0% by weight. Alternatively, the visibly opaque layer may include infrared reflective or absorbing pigments at low enough levels such that the infrared detector (described hereinafter) is still capable of detecting the concealed pattern. The visibly opaque layer may include infrared reflective or absorbing pigments that reflect or absorb in the infrared region at a different wavelength compared to the wavelength in the infrared region detected by the infrared detector, as such reflection or absorbance would have minimal impact on the infrared detector detecting the concealed pattern.

The component may include a plurality of visibly opaque layers over the pattern(s), such as a first visibly opaque layer and a second visibly opaque layer. The first visibly opaque layer may include the same or different infrared transparent pigments compared to the second visibly opaque layer. The first visibly opaque layer and the second visibly opaque layer may be transparent to infrared electromagnetic radiation at different wavelengths in the infrared electromagnetic spectrum.

The visibly opaque layer may include titanium dioxide. The titanium dioxide may have an average particle size from 0.1-1 μm, such as from 0.2-0.5 μm, with average particle size measured according to any suitable standard. The titanium dioxide in the visibly opaque layer may be transparent to infrared electromagnetic radiation in the range of 1100-2500 nm, such as 1600-2500 nm.

Any of the previously described coating layers (e.g., the pattern, the optional primer layer, and/or the visibly opaque layer) may include other optional materials well known in the art of formulating surface coatings, such as plasticizers, anti-oxidants, hindered amine light stabilizers, UV light absorbers and stabilizers, surfactants, flow control agents, thixotropic agents such as bentonite clay, pigments, fillers, organic co-solvents, catalysts, including phosphonic acids, and other customary auxiliaries.

The coating compositions from which each of the coating layers described above are deposited may be applied to a substrate by any of a variety of methods including dipping or immersion, spraying, intermittent spraying, dipping followed by spraying, spraying followed by dipping, brushing, or roll-coating, powder coating, among other methods. In certain examples, the coating compositions may be applied by spraying and, accordingly, such compositions may have a viscosity that is suitable for application by spraying at ambient conditions.

The pattern may be applied as a coating layer using any of the above-described application techniques and/or using a masking technique. The coating composition of the pattern may be selectively applied over the substrate and/or the optional primer layer by first applying a mask to the substrate and/or the optional primer layer and then applying the coating composition of the pattern thereover, such that the masked regions are not contacted by the coating composition of the pattern, while the exposed regions are contacted by the coating composition of the pattern. The mask may then be removed. The coating composition of the pattern may be selectively applied to the substrate and/or the optional primer layer by slot die coating, flexographic printing, gravure printing, syringe dispense printing, and/or aerosol jet printing.

After application of a coating composition to the substrate, it may be allowed to coalesce to form a substantially continuous film on the substrate. The dry film thickness may range from 0.01 mil to 20 mils (0.25 μm to 508 μm), such as 0.01 mil to 5 mils (0.25 μm to 127 μm), or, in some cases, 0.1 mil to 2 mils (2.54 μm to 50.8 μm) in thickness. In certain examples, the curing of these coating layers may include a flash at ambient or elevated temperatures followed by a thermal bake. Curing may occur at ambient temperature of 20° C.-27° C. to elevated temperatures of from 28° C. to 175° C.

The component including the concealed pattern may be prepared by optionally applying the primer layer over at least a portion of the substrate. The pattern may be applied over at least a portion of the optional primer layer and/or the substrate. The visibly opaque layer may be applied over at least a portion of the pattern.

Referring to FIGS. 1A-1F, various components including a concealed pattern are shown.

Referring to FIG. 1A, a component 1 including a concealed pattern may include a substrate 3. A first pattern 5 may be disposed directly over at least a portion of the substrate 3. A first visibly opaque layer 6 may be disposed over at least a portion of the first pattern 5. The reflectivity and/or absorbance of infrared electromagnetic radiation by the first pattern 5 at one wavelength may be different from the reflectivity and/or absorbance by the substrate 3 at the same wavelength.

Figure 1B:
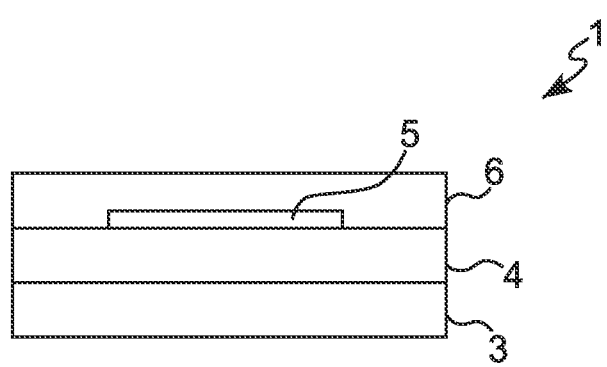
FIG. 1B shows a component including a concealed pattern.

Referring to FIG. 1B, the component 1 including a concealed pattern may include the substrate 3. A first primer layer 4 may be disposed over at least a portion of the substrate 3. The first pattern 5 may be directly disposed over at least a portion of the first primer layer 4. The first visibly opaque layer 6 may be disposed over at least a portion of the first pattern 5. The reflectivity and/or absorbance of infrared electromagnetic radiation by the first pattern 5 at one wavelength may be different from the reflectivity and/or absorbance by the first primer layer 4 at the same wavelength. The first visibly opaque layer 6 may be transparent at a wavelength at which the substrate 3, the first primer layer 4, and/or the first pattern 5 are reflective.

Figure 1C:
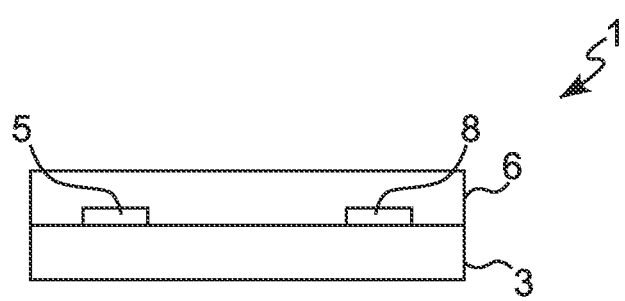
FIG. 1C shows a component including a plurality of concealed patterns.

Referring to FIG. 1C, the component 1 including a concealed pattern may include the substrate 3. The first pattern 5 and a second pattern 8 (different from and/or spatially separated from the first pattern 5) may be disposed directly over at least a portion of the substrate 3. The first visibly opaque layer 6 may be disposed over at least a portion of the first pattern 5 and the second pattern 8. The reflectivity and/or absorbance of infrared electromagnetic radiation by the first pattern 5 at one wavelength may differ from the reflectivity and/or absorbance by the substrate 3 (over which it is directly disposed) at the same wavelength. The reflectivity and/or absorbance of infrared electromagnetic radiation by the second pattern 8 at one wavelength may differ from the reflectivity and/or absorbance by the substrate 3 (over which it is directly disposed) at the same wavelength. The reflectivity and/or absorbance of infrared electromagnetic radiation by the first pattern 5 at one wavelength may differ from the reflectivity and/or absorbance by the second pattern 8 at the same wavelength, such that the first pattern 5 and the second pattern 8 may be detectable at different wavelengths.

Figure 1D:
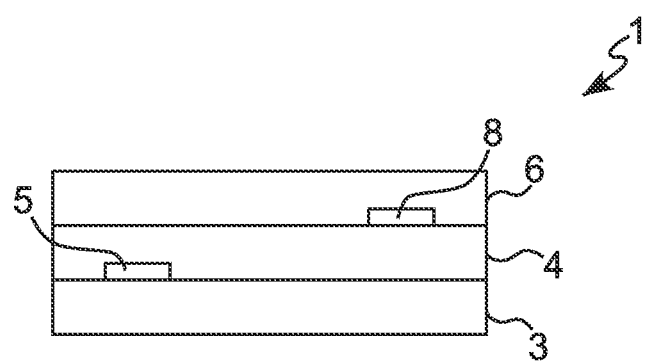
FIG. 1D shows a component including a plurality of concealed patterns.

Referring to FIG. 1D, the component 1 including a concealed pattern may include the substrate 3. The first pattern 5 may be disposed over at least a portion of the substrate 3. The first primer layer 4 may be disposed over at least a portion of the first pattern 5, and the first primer layer 4 may be at least partially transparent in a region in the infrared electromagnetic spectrum in which the first pattern reflects or emits infrared electromagnetic radiation. The second pattern 8 may be disposed over at least a portion of the first primer layer 4. The first opaque layer 6 may be disposed over at least a portion of the second pattern 8. The reflectivity and/or absorbance of infrared electromagnetic radiation by the first pattern 5 at one wavelength may differ from the reflectivity and/or absorbance by the substrate 3 (over which it is directly disposed) at the same wavelength. The reflectivity and/or absorbance of infrared electromagnetic radiation by the second pattern 8 at one wavelength may differ from the reflectivity and/or absorbance by the first primer layer 4 (over which it is directly disposed) at the same wavelength. The reflectivity and/or absorbance of infrared electromagnetic radiation by the first pattern 5 at one wavelength may differ from the reflectivity and/or absorbance by the second pattern 8 at the same wavelength, such that the first pattern 5 and the second pattern 8 may be detectable at different wavelengths. It will be appreciated that the layers of the component disposed over the layer reflecting the infrared radiation being detected by an infrared detector may be transparent at the same wavelength in the infrared radiation being detected. Referring to FIGS. 1D and 1C, two patterns are shown for each of the components 1; however, it will be appreciated that any number of patterns may be included in the component 1, and a reflectivity and/or absorbance of any one of the patterns may be different from the reflectivity and/or absorbance of any of the other patterns such that the patterns are distinguishable from one another by an infrared detector.

Figure 1E:
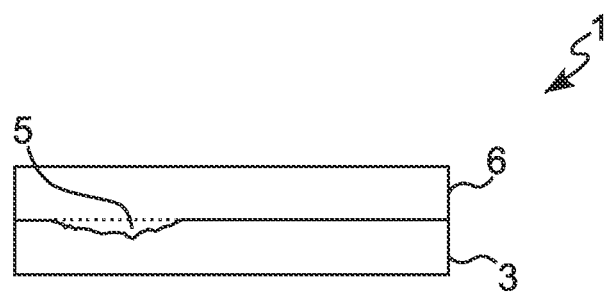
FIG. 1E shows a component including a concealed pattern.

Referring to FIG. 1E, the component 1 including a concealed pattern may include the substrate 3. The first visibly opaque layer 6 may be disposed over at least a portion of the substrate 3. A surface of the substrate 3 may have deteriorated (e.g., corroded or cracked) under the first visibly opaque layer 6, such that the deterioration is invisible to a human eye. The surface deterioration may be considered the first pattern 5. The reflectivity and/or absorbance of infrared electromagnetic radiation by the first pattern 5 at one wavelength may be different from the reflectivity and/or absorbance by the substrate 3 at the same wavelength, such that the surface deterioration is detectable. The reflectivity and/or absorbance of infrared electromagnetic radiation by the first pattern 5 at one wavelength may be different from the reflectivity and/or absorbance by the substrate 3 at the same wavelength, such that the deterioration is detectable.

Figure 1F:
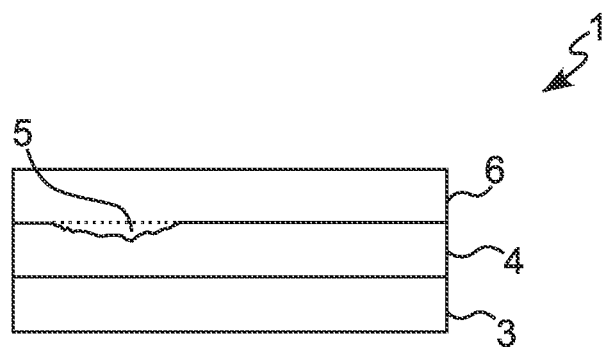
FIG. 1F shows a component including a concealed pattern.

Referring to FIG. 1F, the component 1 including a concealed pattern may include the substrate 3. The first primer layer 4 may be disposed over at least a portion of the substrate 3. The first visibly opaque layer 6 may be disposed over at least a portion of the first primer layer 4. At least a portion of the first primer layer 4 (or any other coating layer of the component 1) may have deteriorated (e.g., corroded) under the first visibly opaque layer 6, such that the deterioration is invisible to a human eye. The deterioration of the first primer layer 4 may be considered the first pattern 5.

Figure 1G:
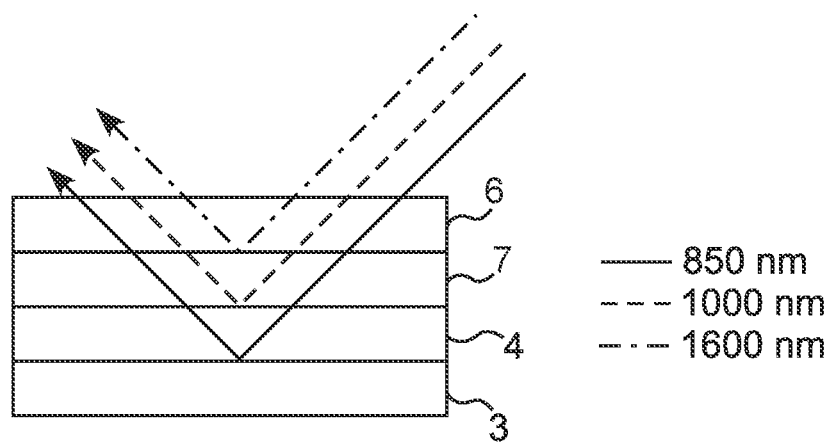
FIG. 1G shows a component including coating layers transparent and reflective at different wavelengths of the infrared spectrum.

Referring to FIG. 1G, the component 1 may include a plurality of layers that are transparent and/or reflective and/or absorbent at different wavelengths in the infrared electromagnetic spectrum. The component 1 in FIG. 1G includes the substrate 3 having the first primer layer 4 thereover, a second coating layer 7 disposed over the first primer layer 4, and the first visibly opaque layer 6 disposed over the second coating layer 7. As illustrated in FIG. 1G, the substrate 3, the first primer layer 4, and the second coating layer 7 may be reflective and/or transparent at different wavelengths in the infrared electromagnetic spectrum. In this example, the substrate 3 is reflective at 850 nm, while the first primer layer 4, the second coating layer 7, and the first visibly opaque layer 6 are transparent at 850 nm. The first primer layer 4 is reflective at 1000 nm, while the second coating layer 7 and the first visibly opaque layer 6 are transparent at 1000 nm. The second coating layer 7 is reflective at 1600 nm, while the first visibly opaque layer 6 is transparent at 1600 nm. This arrangement of coating layers having different transparent, reflective, or absorbent characteristics allows for one or more patterns to be disposed over the various layers of the component and selectively detected. The patterns may also be transparent, reflective, or absorbent at different wavelengths in the infrared electromagnetic spectrum.

Figure 1H:
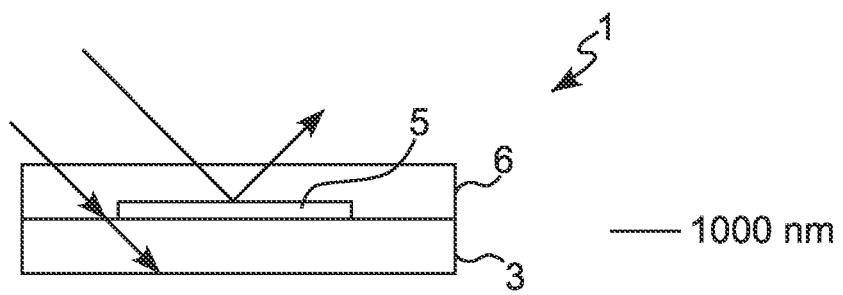
FIG. 1H shows a component including a concealed pattern.

Referring to FIG. 1H, the component 1 may include the first pattern 5 positioned over the substrate 3, and the first visibly opaque layer 6 positioned over the first pattern 5. In FIG. 1H, the first visibly opaque layer 6 is transparent at 1000 nm, the first pattern 5 is reflective at 1000 nm, and the substrate is absorbent at 1000 nm. In this manner, the reflected infrared wavelength from the first pattern 5 may be detectable by an infrared detector. The detector may be capable of detecting any number of patterns over a single component or over a plurality of components. In some examples, the substrate 3 may be transparent to the 1000 nm infrared wavelength. It is also appreciated that the component 1 may include additional layers, such as the first primer layer 4 of FIG. 1G. It will be appreciated that any of the layer structures shown and described herein may be repeated to form larger coating stacks.

The component including the concealed pattern (as previously described) may be detected via a system and method for detecting such a component including a concealed pattern.

The method may include detecting infrared electromagnetic radiation reflected or emitted by the previously-described component including the pattern and comparing the reflectivity and/or absorbance of infrared electromagnetic radiation by the first pattern at one wavelength to the reflectivity and/or absorbance of the primer layer and/or the substrate at the same wavelength. The method may further include directing, from an infrared source, infrared radiation having a predetermined wavelength in the infrared region at the component including the pattern. The method may further include identifying the pattern, an orientation of the pattern, a condition of the pattern, and/or a distance to the pattern, with at least one processor, based on the detected infrared radiation. The method may further include determining, with at least one processor, component identifying information associated with the component based on the identified pattern, the orientation of the pattern, a condition of the pattern, and/or the distance to the pattern.

Figure 2A:
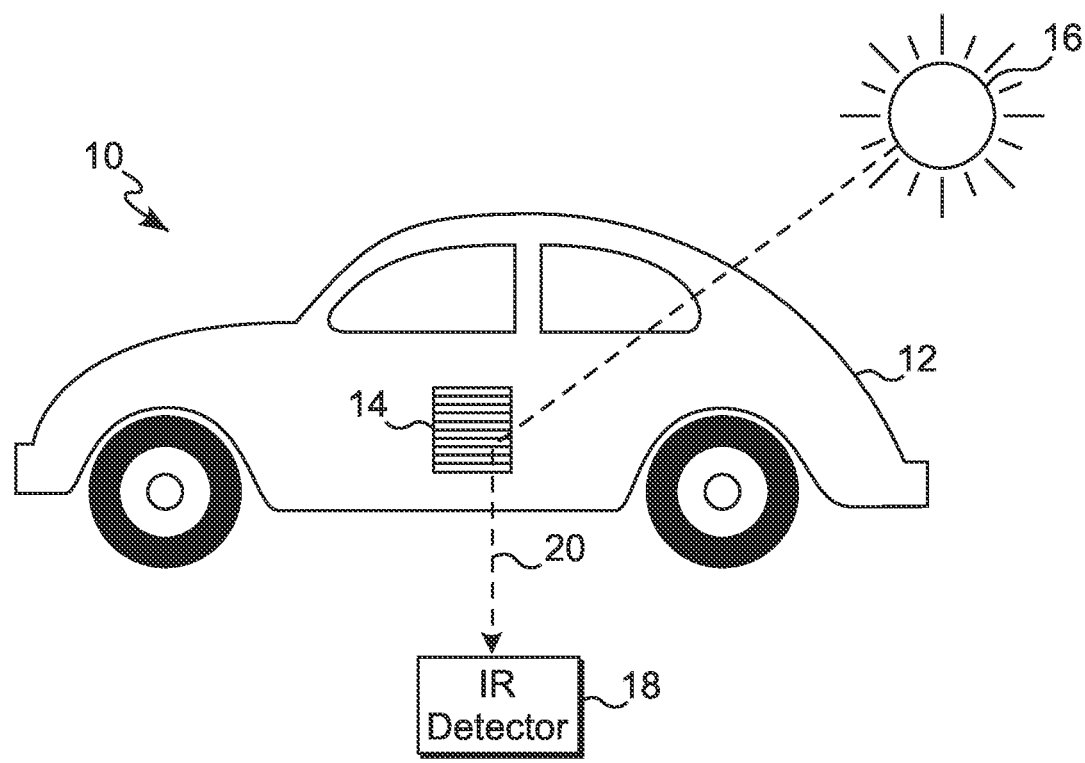
FIG. 2A shows a schematic view of a system for detecting a component including a concealed pattern.
Figure 2B:
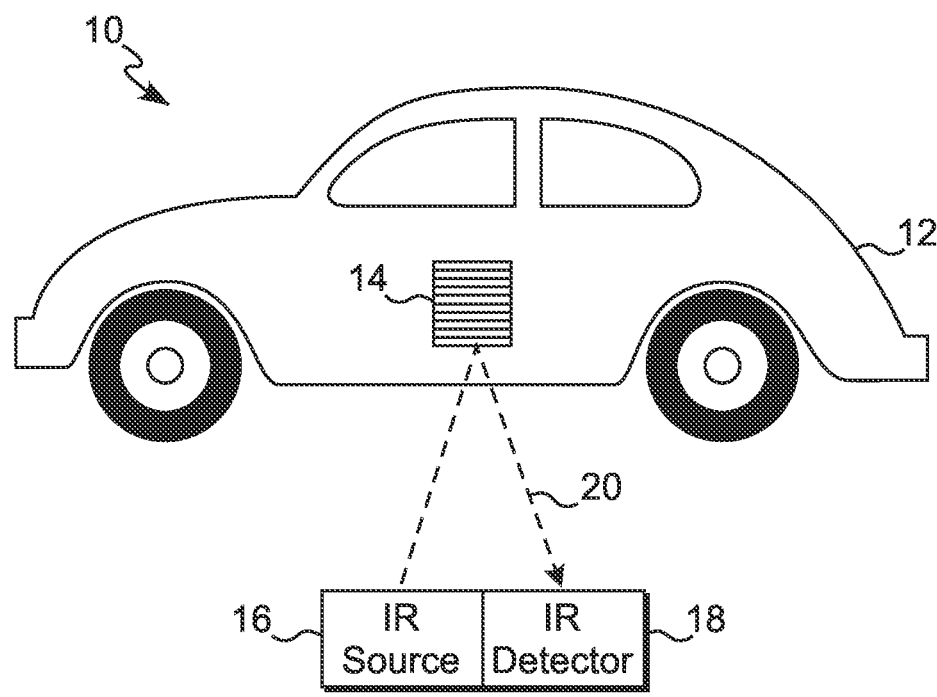
FIG. 2B shows a schematic view of a system for detecting a component including a concealed pattern.

Referring to FIGS. 2A and 2B, a system 10 for detecting a component including a pattern is shown, and the system 10 may be configured to execute the above-described method. The system may include the component 12, which is illustrated as an automobile (vehicle component), but it will be appreciated that the component 12 may be any of the previously-described components. The component 12 may have a pattern 14 disposed over at least a portion of the substrate of the component 12. While the pattern 14 is visible in FIGS. 2A and 2B, the pattern 14 is actually positioned beneath a visibly opaque layer (as previously described) so as to be concealed to a human eye. Thus, the component 12 is a component including a concealed pattern as previously described.

The system 10 may further include an infrared source 16 capable of producing infrared radiation and directing the infrared radiation at the component 12. The infrared source 16 that may be used in the system 10 includes, without limitation, light emitting diodes (LEDs), laser diodes or any light source that is capable of emitting electromagnetic radiation having a wavelength from 700 nm to 1 mm (in the infrared range) or 700 nm to 2500 nm (in the near-IR range). The infrared source 16 may be used in an imaging LIDAR (Light Imaging, Detection and Ranging) system. The imaging LIDAR system may utilize lasers to generate electromagnetic radiation with a wavelength from 700-2500 nm, such as 1100-2500 nm, such as from 900-1600 nm. The LIDAR system may utilize lasers to generate electromagnetic radiation with a wavelength of 805 nm, 905 nm, 1550 nm, or any other suitable wavelength in the infrared range. The infrared source 16 may be a natural infrared source (e.g., shown in FIG. 2A), such as sunlight, moonlight, and/or other ambient infrared sources.

The system 10 may include an infrared detector 18 capable of detecting reflected infrared radiation 20, reflected off of the component 12 (e.g., the pattern, substrate, or optional primer layer thereof). The infrared detector 18 may be a semiconductor detector that is capable of sensing infrared radiation. Such infrared detectors 18 may include a photodiode or an image sensor. The infrared detector 18 may be coupled in the same housing unit with the infrared source 16 (see FIG. 2B), such as a LIDAR system that houses both the infrared source 16 and the infrared detector 18. Alternatively, the infrared detector 18 may be in a separate housing from the infrared source 16 (see FIG. 2A).

With continued reference to FIGS. 2A and 2B, the infrared source 16 may direct infrared radiation toward the component 12. At least a portion of this infrared radiation may reflect off of the component 12 (e.g., a layer thereof, such as the pattern 14) as reflected infrared radiation 20, which may be detected by the infrared detector 18.

Figure 3:
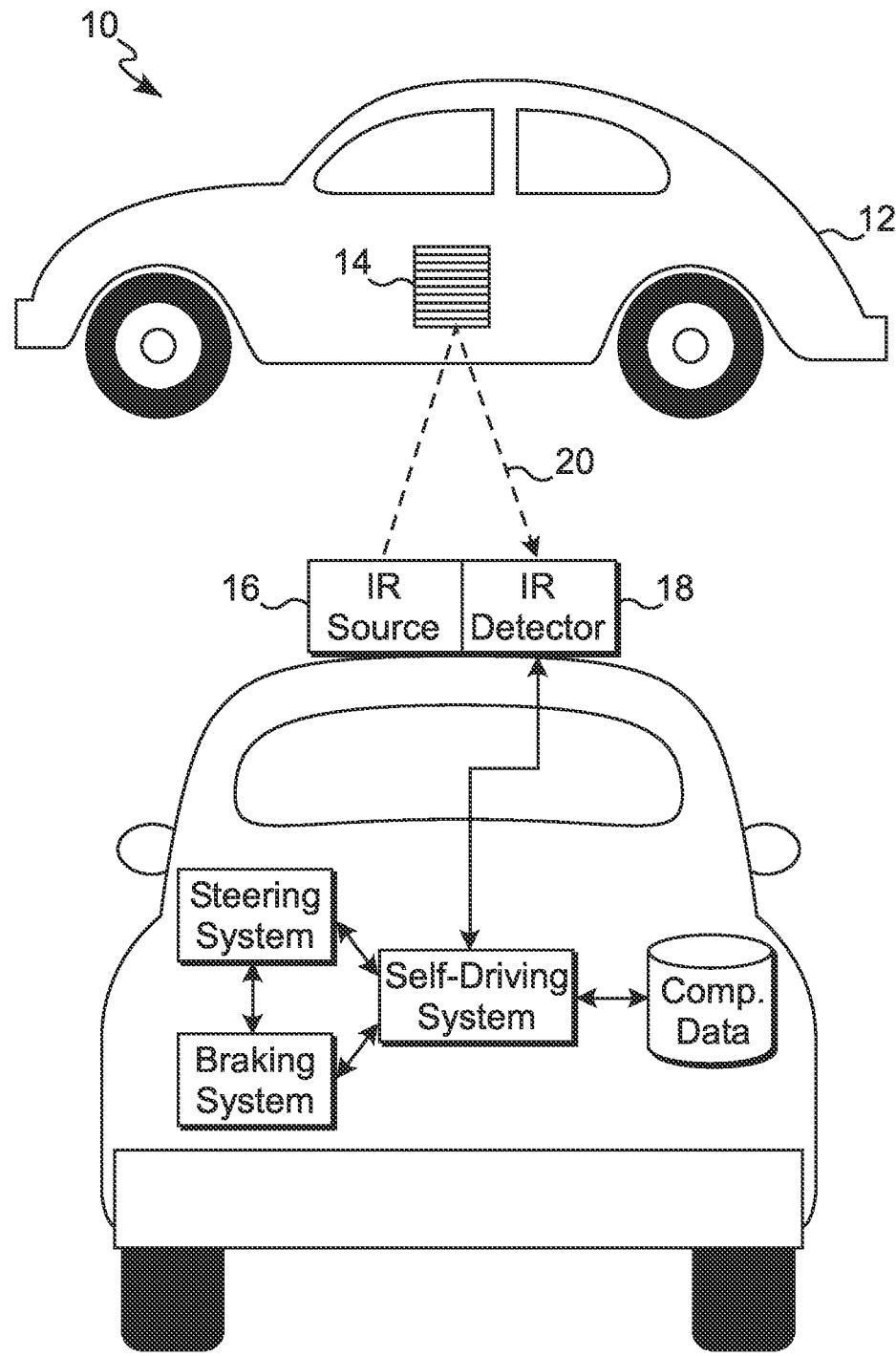
FIG. 3 shows a schematic view of a system for detecting a component including a concealed pattern.

Referring to FIG. 3, a system 10 for detecting a component 12 (a first component) including the pattern 14 is shown that is the same as in FIG. 2B, but includes the following additional features. The system may further include a computer system including at least one processor that is in communication with the infrared detector 18. In the non-limiting example, shown in FIG. 3, the infrared source 16, the infrared detector 18, and the computer system are mounted to a second vehicle (e.g., an automobile) (a second component). However, it will be appreciated that in other non-limiting applications, the infrared source 16, the infrared detector 18, and the computer system may not be mounted to a vehicle and are useable in other non-related applications. FIG. 3 shows the invention in the specific application of autonomous vehicles for illustrative purposes only.

With continued reference to FIG. 3, the computer system may include a self-driving system, a component database 24, a steering system 26, and a braking system 28. In response to the infrared detector 18 detecting infrared radiation reflected off of the component 12, the infrared detector 18 may communicate a signal to the self-driving system that includes information associated with the detected infrared radiation. The self-driving system may communicate with the component database 24 to identify the pattern based on the detected infrared radiation (based on pattern data stored therein) and may further determine component identifying information associated with the component 12 (the automobile) based on the identified pattern. However, it will be appreciated that the infrared detector 18 may identify the pattern and communicate the identified pattern to the computer system (e.g., the self-driving system) for further processing. The component database 24 may include information associating various known patterns (e.g., barcodes and/or QR codes) with known objects.

With continued reference to FIG. 3, the pattern 14 identified may be associated with information associated with the particular automobile over which the pattern 14 is disposed. This information may include ownership information and/or vehicle information. The vehicle information may include the make, model, and year of the automobile; vehicle identification number (VIN); maintenance history of the automobile; dimensions of the automobile, and the like.

Based on the data associated with the automobile (based on the pattern 14), the self-driving system may communicate with one or both of the steering system 26 and the braking system 28 to control steering and/or braking of the second automobile. Thus, based on the pattern 14 detected by the system 10, the self-driving system may control the second automobile to avoid a collision with the component 12 (the first vehicle).

Based on the infrared radiation detected from the infrared detector 18, the infrared detector 18 and/or the self-driving system may additionally or alternatively determine the orientation of the pattern, a condition of the pattern, and/or the distance to the pattern. The determined distance to the pattern may be used by the self-driving system to communicate with the steering system 26 and/or the braking system 28 to determine how to brake or steer the second automobile based on the distance between second automobile and the component 12. The determined orientation of the component may be used by the self-driving system to determine the orientation of the component in the path of the second automobile. The second automobile may communicate with the component 12 (the first vehicle) based on this determination, in order to coordinate actions between the vehicles, such as communicating to the first vehicle 12 to stop, turn, accelerate, and the like (e.g., vehicle caravan applications).

In the system 10 shown in FIG. 3, the first automobile 12 functions as a first component in the system having the pattern 14, while the second automobile functions as a second component having an infrared detector 18, illustrating the invention in the non-limiting application of autonomous vehicles. In other applications, a system for detecting a component including a concealed pattern may also include a first component having the pattern and a second component including the infrared detector and/or an infrared source. The infrared source of the second component may direct infrared electromagnetic radiation towards the first component. The second component may include a computing device that identifies the first pattern based on the reflected infrared electromagnetic radiation and determines, based on the identified first pattern, component identifying information associated with the first component, orientation of the first pattern, a condition of the pattern, and/or a distance to the first pattern.

It will be appreciated that alternate computer systems may be included in the system based on the application of the system (systems other than those including the self-driving system are within the scope of this invention). For VR/AR applications, a computer system may be included to determine information about objects in the surroundings of the VR/AR environment based on the detected pattern on the object. For packaging or label applications, a computer system may be included to determine information about the objects included in the packaging and/or the delivery thereof or on which the label is placed. For identification component applications, a computer system may be included to determine information about the individual to whom the identification device was issued and/or to verify the authenticity of the identification component. Thus, the computer system in these applications may be used to determine data about the component, which is identified based on the pattern thereon, which also includes distance to the component, a condition of the pattern, or the orientation of the component.

The present invention further includes the subject matter of the following clauses:

Clause 1: A component including a concealed pattern, comprising: a substrate; a pattern disposed over at least a portion of the substrate; an optional primer layer disposed between at least a portion of the substrate and at least a portion of the pattern; and a visibly opaque layer comprising an infrared transparent pigment, the visibly opaque layer disposed over at least a portion of the pattern, wherein the reflectivity and/or absorbance of infrared electromagnetic radiation by the pattern at one wavelength differs from the reflectivity and/or absorbance by the primer layer and/or the substrate at the same wavelength.

Clause 2: The component of clause 2, wherein the visibly opaque layer is substantially free of an infrared absorbing pigment and/or an infrared reflective pigment.

Clause 3: The component of clause 1 or 2, wherein the pattern comprises an infrared reflective pigment and the primer layer is substantially free of any infrared reflective pigment.

Clause 4: The component of any of the preceding clauses, wherein the primer layer comprises an infrared reflective pigment and the pattern is substantially free of any infrared reflective pigment.

Clause 5: The component of any of the preceding clauses, wherein the pattern comprises a unique identifier.

Clause 6: The component of clause 5, wherein the unique identifier comprises a machine-readable code.

Clause 7: The component of any of the preceding clauses, wherein the substrate comprises a vehicle component or vehicle surroundings, a surface in a virtual reality/augmented reality (VR/AR) environment, packaging, a label, and/or an identification component.

Clause 8: A method for preparing a component including a concealed pattern, comprising: optionally applying a primer layer over at least a portion of a substrate; applying a pattern over at least a portion of the primer layer and/or at least a portion of the substrate; and applying a visibly opaque layer over at least a portion of the pattern, the visibly opaque layer comprising an infrared transparent pigment, wherein the reflectivity and/or absorbance of infrared electromagnetic radiation by the pattern at one wavelength differs from the reflectivity and/or absorbance by the primer layer and/or the substrate at the same wavelength.

Clause 9: The method of clause 8, wherein the visibly opaque layer is substantially free of an infrared absorbing pigment and/or an infrared reflective pigment.

Clause 10: The method of clause 8 or 9, wherein the pattern comprises a machine-readable code.

Clause 11: The method of any of clauses 8-10, wherein the substrate comprises a vehicle component or vehicle surroundings, a surface in a virtual reality/augmented reality (VR/AR) environment, packaging, a label, and/or an identification component.

Clause 12: A method for detecting a component including a concealed pattern comprising: detecting infrared electromagnetic radiation reflected or emitted by a component including a first pattern, the component comprising: a substrate; the first pattern disposed over at least a portion of the substrate; an optional primer layer disposed between at least a portion of the substrate and at least a portion of the first pattern; and a first visibly opaque layer comprising an infrared transparent pigment, the first visibly opaque layer disposed over at least a portion of the first pattern; and comparing the reflectivity and/or absorbance of infrared electromagnetic radiation by the first pattern at one wavelength to the reflectivity and/or absorbance by the primer layer and/or the substrate at the same wavelength.

Clause 13: The method of clause 12, further comprising: directing, from an infrared source, infrared electromagnetic radiation having a predetermined wavelength in the infrared region at the component including the first pattern.

Clause 14: The method of clause 12 or 13, further comprising: based on the detected infrared electromagnetic radiation, identifying the first pattern, an orientation of the first pattern, a condition of the pattern, and/or a distance to the first pattern.

Clause 15: The method of clause 14, further comprising: determining, with at least one processor and based on the identified first pattern, component identifying information associated with the component, orientation of the first pattern, a condition of the pattern, and/or distance to the first pattern.

Clause 16: The method of any of clauses 12-15, wherein the first visibly opaque layer is substantially free of an infrared absorbing pigment and/or an infrared reflective pigment.

Clause 17: The method of any of clauses 12-16, wherein the first pattern comprises an infrared reflective pigment and the primer layer is substantially free of any infrared reflective pigment.

Clause 18: The method of any of clauses 12-17, wherein the primer layer comprises an infrared reflective pigment and the first pattern is substantially free of any infrared reflective pigment.

Clause 19: The method of any of clauses 12-18, wherein the first pattern comprises a machine readable code.

Clause 20: The method of any of clauses 12-19, wherein the first pattern is formed from a surface deterioration of the substrate of the component.

Clause 21: The method of any of clauses 12-20, wherein the substrate comprises a vehicle component or vehicle surroundings, a surface in a virtual reality/augmented reality (VR/AR) environment, packaging, a label, and/or an identification component.

Clause 22: The method of any of clauses 12-21, wherein the component further comprises a second pattern disposed over the substrate, wherein the reflectivity and/or absorbance of infrared electromagnetic radiation by the first pattern at one wavelength differs from the reflectivity and/or absorbance by the second pattern at the same wavelength.

Clause 23: The method of clause 22, further comprising: directing, from an infrared source, infrared electromagnetic radiation having a predetermined wavelength in the infrared region at the component including the second pattern; based on the detected infrared electromagnetic radiation, identifying the second pattern, an orientation of the second pattern, a condition of the pattern, and/or a distance to the second pattern.

Clause 24: The method of clause 22 or 23, wherein the first pattern is disposed directly over a layer of the component, the layer including the substrate or a coating layer of the component and beneath the first visibly opaque layer; and the second pattern is disposed directly over a different layer of the component compared to the first pattern, and the second pattern is disposed beneath the first visibly opaque layer.

Clause 25: The method of any of clauses 22-24, wherein the first pattern reflects or emits infrared electromagnetic radiation in the range of 800-1000 nm and the second pattern reflects or emits infrared electromagnetic radiation in the range of 1600-2500 nm.

Clause 26: The method of any of clauses 12-25, wherein the component further comprises a second visibly opaque layer comprising an infrared transparent pigment, the second visibly opaque layer disposed over at least a portion of the first pattern, wherein the first visibly opaque layer and the second visibly opaque layer are transparent at different wavelengths from each another in the infrared electromagnetic spectrum.

Clause 27: The method of clause 26, wherein the second visibly opaque layer comprises titanium dioxide.

Clause 28: The method of clause 27, wherein the titanium dioxide has an average particle size from 0.2-0.5 µm.

Clause 29: A system for detecting a component including a concealed pattern comprising: (a) a first component comprising: a substrate; a first pattern disposed over at least a portion of the substrate; an optional primer layer disposed between at least a portion of the substrate and at least a portion of the first pattern; and a first visibly opaque layer comprising an infrared transparent pigment, the first visibly opaque layer disposed over at least a portion of the first pattern, wherein the reflectivity and/or absorbance of infrared electromagnetic radiation by the first pattern at one wavelength differs from the reflectivity and/or absorbance by the primer layer and/or the substrate at the same wavelength; and (b) a second component comprising an infrared detector that detects infrared electromagnetic radiation reflected or emitted from the first component.

Clause 30: The system of clause 29, wherein the second component further comprises an infrared source that directs infrared electromagnetic radiation toward the first component.

Clause 31: The system of clause 30, wherein the second component further comprises a computing device that identifies, with at least one processor, the first pattern based on the reflected infrared electromagnetic radiation and determines, with at least one processor and based on the identified first pattern, component identifying information associated with the first component, orientation of the first pattern, a condition of the pattern, and/or distance to the first pattern.

Clause 32: A component including a concealed pattern comprising: a substrate; a first pattern disposed over at least a portion of the substrate; a second pattern disposed over at least a portion of the substrate; an optional primer layer disposed between at least a portion of the substrate and at least a portion of the first pattern or the second pattern; and a first visibly opaque layer comprising an infrared transparent pigment, the first visibly opaque layer disposed over at least a portion of the first pattern and the second pattern, wherein the reflectivity and/or absorbance of infrared electromagnetic radiation by the first pattern at one wavelength differs from the reflectivity and/or absorbance by the second pattern at the same wavelength, and wherein the first pattern is disposed directly over a layer of the component, the layer including the substrate or a coating layer of the component and beneath the first visibly opaque layer; and the second pattern is disposed directly over a different layer of the component compared to the first pattern, and the second pattern is disposed beneath the first visibly opaque layer, wherein the reflectivity and/or absorbance of infrared electromagnetic radiation by the first pattern at one wavelength differs from the reflectivity and/or absorbance by the layer over which the first pattern is directly disposed, and wherein the reflectivity and/or absorbance of infrared electromagnetic radiation by the second pattern at one wavelength differs from the reflectivity and/or absorbance by the layer over which the second pattern is directly disposed.

Clause 33: A method for detecting a component including a concealed pattern, comprising: detecting infrared electromagnetic radiation of a preselected wavelength range, reflected or emitted by a component including a first pattern, the component comprising: a substrate; the first pattern disposed over at least a portion of the substrate; an optional primer layer disposed between at least a portion of the substrate and at least a portion of the first pattern; and a first visibly opaque layer comprising an infrared transparent pigment, the first visibly opaque layer disposed over at least a portion of the first pattern, the first visibly opaque layer transparent at the preselected wavelength range, and comparing the reflectivity and/or absorbance of the preselected infrared electromagnetic radiation by the first pattern at one wavelength to the reflectivity and/or absorbance by the primer layer and/or the substrate at the same wavelength, wherein the infrared radiation wavelength is selected so that the infrared reflectance and/or absorbance of the preselected infrared electromagnetic radiation by the first pattern is different from the reflectivity and/or absorbance by the primer layer and/or the substrate at the same wavelength.

EXAMPLES

The following examples are presented to demonstrate the general principles of the invention. The invention should not be considered as limited to the specific examples presented.

Example 1

Panel Preparation

Cold-rolled steel panels electrocoated with ED6465 (ACT Test Panels LLC (Hillsdale, MI) Item No 18239) were used as the substrate. A commercial white sealer (DAS 3021 available from PPG Industries, Inc. (Pittsburgh, PA)) was applied to the substrate using a HVLP spray gun in a single coat to a thickness of 31 µm. The panel was flashed horizontally in ambient conditions (20° C.-27° C.) for 15 minutes prior to being baked at 80° C. for 30 minutes.

A vinyl sticker masking template was then applied to the panel, ensuring that the only exposed panel surface was the barcode and PPG logo area. Commercial black toner (DMD 1683 available from PPG Industries, Inc. (Pittsburgh, PA)), was then applied using an HVLP spray gun in a single coat to hiding, at which point the black coating was 3 µm thick. The sticker was then removed from the panel and the panel was flashed horizontally for 5 minutes in ambient conditions (20° C.-27° C.) before being baked at 80° C. for 30 minutes.

The barcoded panel was then coated with IR transparent DESOTHANE CA 8000/SR8000 BAC 701 solar reflective black topcoat (available from PPG Industries, Inc. (Pittsburgh, PA)). An HVLP gun was used to apply the topcoat in two coats to a final thickness of 63 µm with a 45 minute horizontal ambient flash between coats. The topcoated panel was flashed horizontally in ambient conditions (20° C.-27° C.) for a final 30 minutes followed by a 60 minute bake at 49° C.

Figures 4A, 4B:
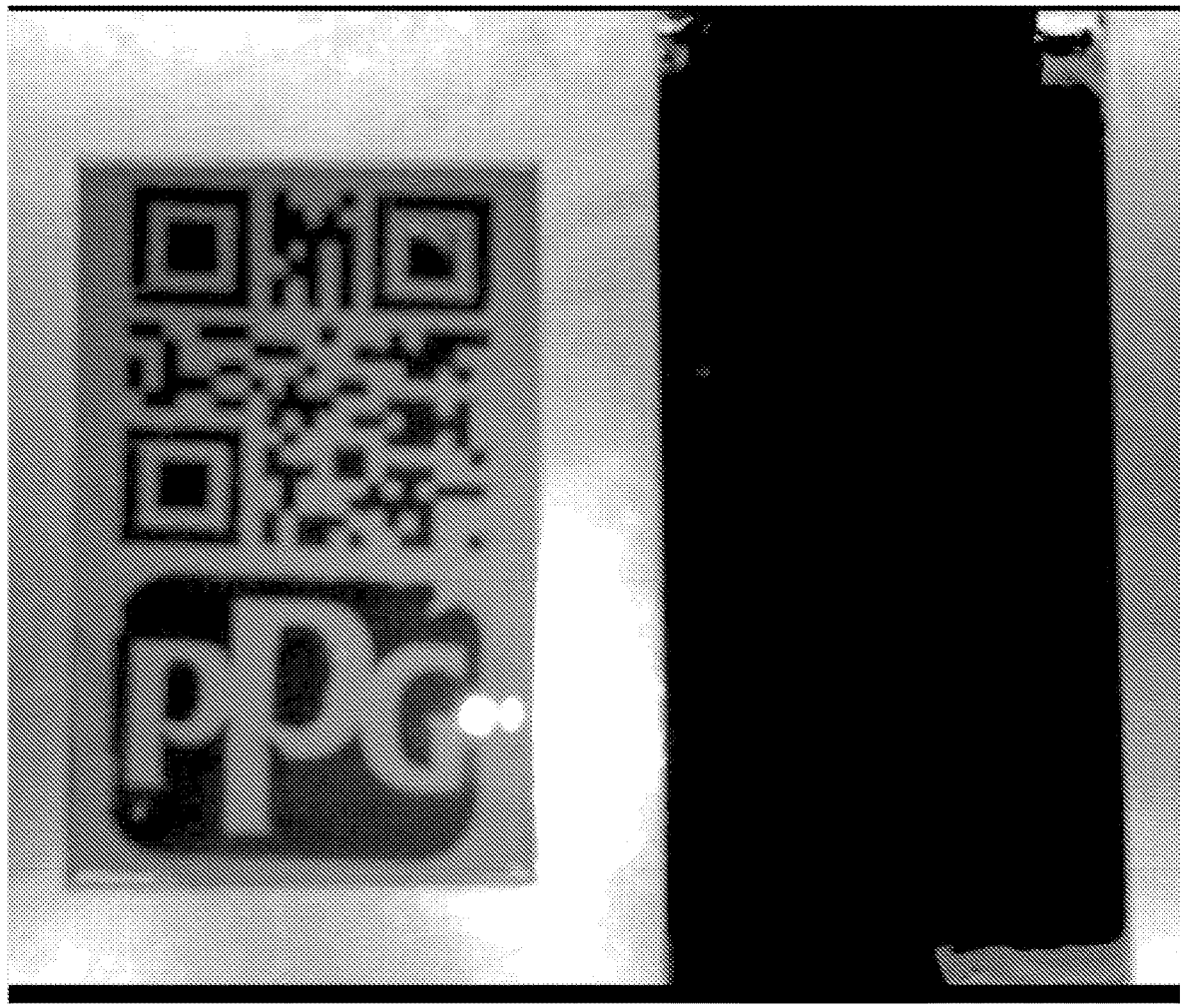
FIG. 4A shows a photograph taken by a video camera in night vision mode of the panel prepared according to Example 1.
FIG. 4B shows a photograph taken by a video camera in night vision mode of the panel prepared according to Comparative Example 2.

FIG. 4A shows a photograph taken by an Ancter Actor-DV-001 video camera in night vision mode of the panel prepared according to Example 1.

Comparative Example 2

Panel Preparation

Cold-rolled steel panels electrocoated with ED6465 (ACT Test Panels LLC (Hillsdale, MI) Item No 18239) were used as the substrate. The commercial white sealer (DAS 3021 available from PPG Industries, Inc. (Pittsburgh, PA)) was applied to the substrate using a HVLP spray gun in a single coat to a thickness of 31 µm. The panel was flashed horizontally in ambient conditions (20° C.-27° C.) for 15 minutes prior to being baked at 80° C. for 30 minutes.

A vinyl sticker masking template was then applied to the panel, ensuring that the only exposed panel surface was the barcode and PPG logo area. Commercial black toner (DMD 1683 available from PPG Industries, Inc. (Pittsburgh, PA)) was then applied using an HVLP spray gun in a single coat to hiding, at which point the black coating was 3 μm thick. The sticker was then removed from the panel and the panel was flashed horizontally for 5 minutes in ambient conditions (20° C.-27° C.) before being baked at 80° C. for 30 minutes.

The barcoded panel was then coated with non-IR transparent DESOTHANE CA 8800/B701 black topcoat (available from PPG Industries, Inc. (Pittsburgh, PA)). An HVLP gun was used to apply the topcoat in two coats to a final thickness of 72 μm with a 45 minute horizontal ambient flash between coats. The topcoated panel was flashed horizontally in ambient conditions (20° C.-27° C.) for a final 30 minutes followed by a 60 minute bake at 49° C.

FIG. 4B shows a photograph taken by an Ancter Actor-DV-001 video camera in night vision mode of the panel prepared according to Comparative Example 2.

As can be seen in the comparison of FIGS. 4A and 4B, the bar code over the panel in which the IR transparent black topcoat is applied thereover is visible in night vision mode, whereas the bar code over the panel in which the non-IR transparent black topcoat is applied thereover remains concealed in night vision mode.

Example 3

Panel Preparation

Figure 5:
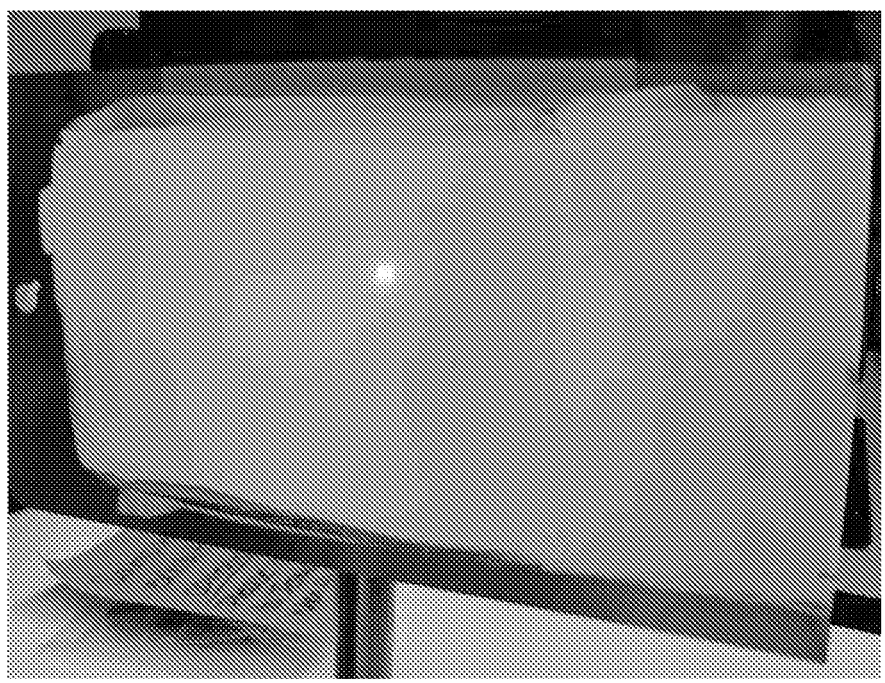
FIG. 5 shows a substrate prepared according to Example 3.

Markings were made on a metallic substrate using a black dye having high absorptivity in the visible to near infrared range. After the dye dried, it was covered with Glidden Paramount architectural flat paint. The metallic substrate coated with the architectural flat paint is shown in the photograph of FIG. 5.

After the architectural flat paint dried, the sample was illuminated by a tungsten lamp.

Figure 6:
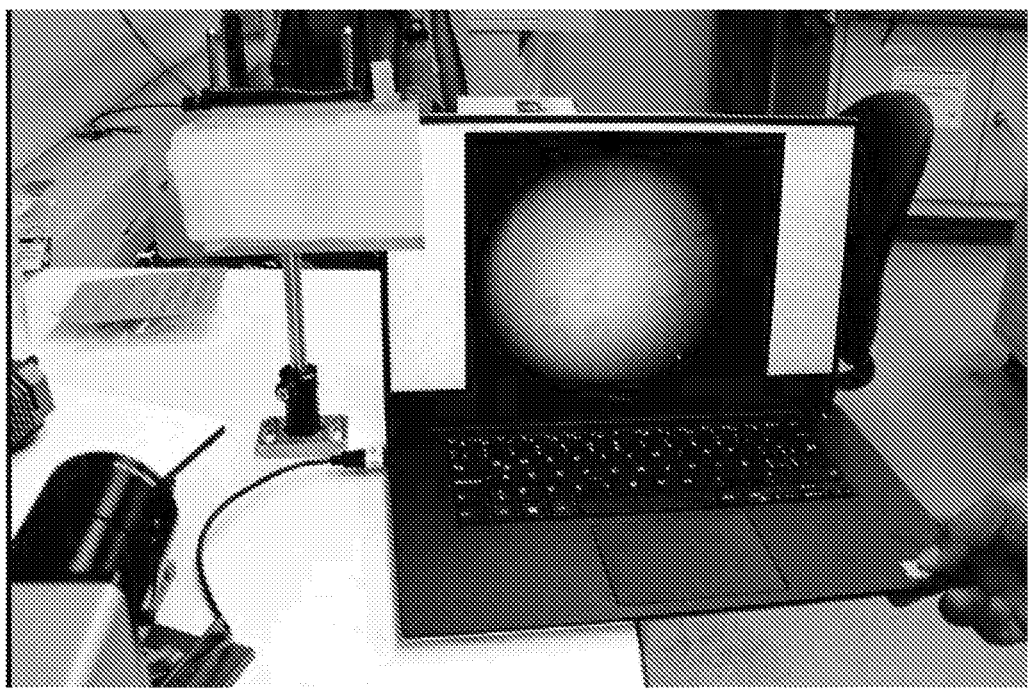
FIG. 6 shows a photograph taken by a short wave near infrared camera of the substrate prepared according to Example 3.

The markings on the metallic substrate beneath the architectural flat paint were detected using a XEVA-2.35 short wave near infrared camera with a spectral sensitivities up to 2350 nm (available from Xenics NV (Leuven, Belgium)) and displayed on a computer as shown in FIG. 6.

Example 4

Panel Preparation

Figure 7:
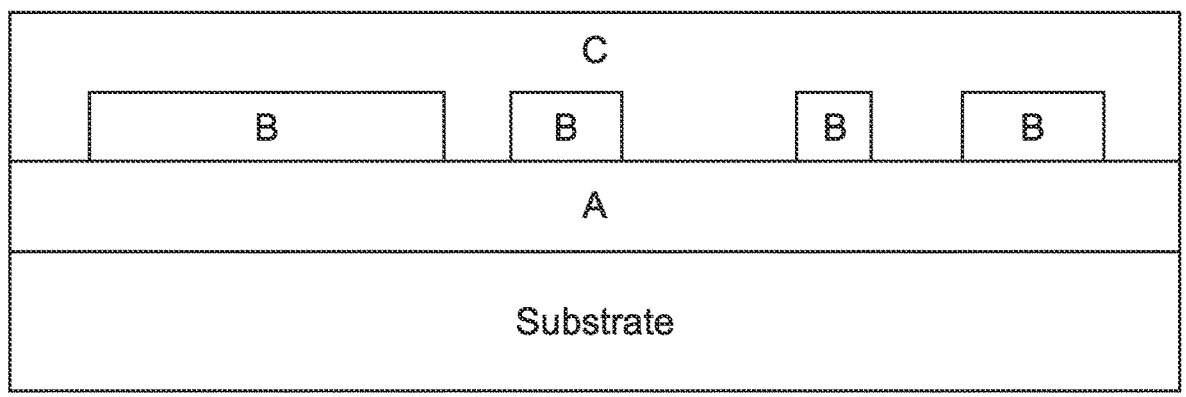
FIG. 7 shows a schematic view of coating layers of the component prepared according to Example 4.

As depicted in FIG. 7, a component including an infrared reflective coating A (in the range of 1100 nm to 2500 nm) was applied to a substrate. The substrate in this example was a sealed plasterboard. The coating A was VINVIEX Total Satin Blanco, available from (Mexico City, Mexico), where TiO2 particles with size in the range of 1-5 μm was included.

Figure 8:
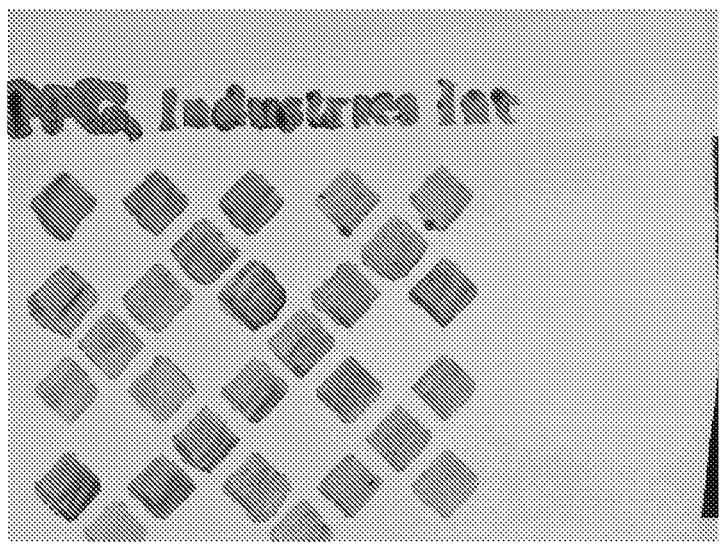
FIG. 8 shows a photograph taken by a visible light camera of a substrate applied with coating A and a pattern of coating B prior to application of coating C.

Over coating A, coating B was applied over certain sections thereof. The applied coating B was opaque to infrared light in the range of 1100 nm to 2500 nm. Coating B was VINIMEX Total Satin Negro, available from (Mexico City, Mexico). FIG. 8 shows a system of coating B (black) applied over sections (to form a pattern) of Coating A (white) before application of coating C.

Figure 9:
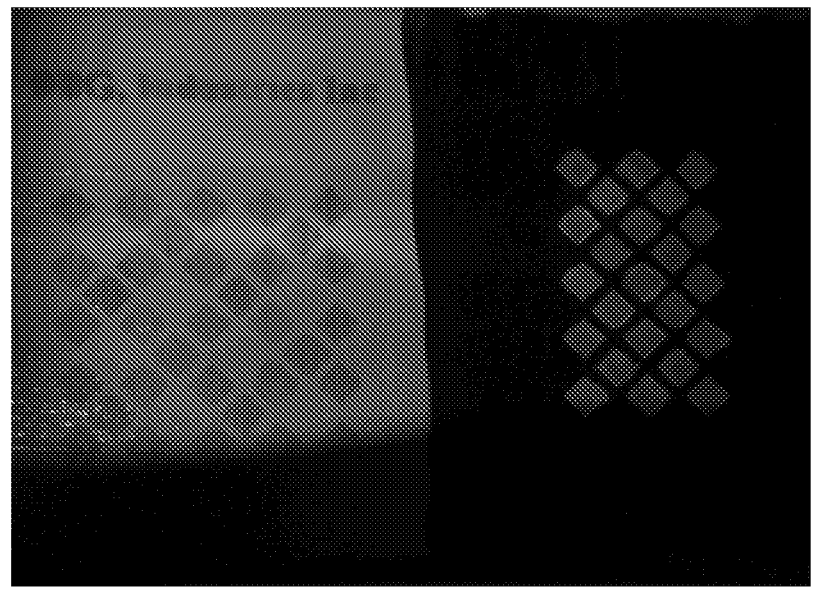
FIG. 9 shows a photograph taken by an short wave near infrared camera of the component prepared according to Example 4, detecting a concealed pattern.
Figure 10:
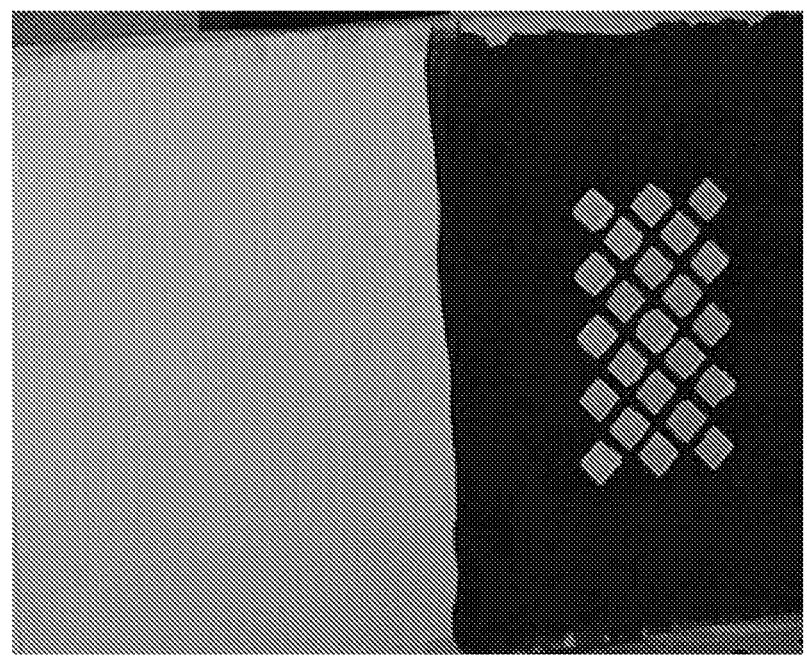
FIG. 10 shows a photograph taken by a visible light camera of the component prepared according to Example 4.

Then, coating C (white) was applied over coating A and coating B. The coating C was transparent or semitransparent to infrared light in the range of 1100 nm to 2500 nm, but coating C was opaque to visible light. Coating C was VINIMEX Total Satin Blanco wherein TiO2 particles in the range of 0.2-0.5 m were included, available from (Mexico City, Mexico). FIG. 9 shows an image of the coating system as described in this example rendered by an IR light camera in the range of 1100 nm to 2350 nm. FIG. 10 shows an image of the coating system as described in this example rendered by a visible light camera.

Example 5

Panel Preparation

Figure 11:
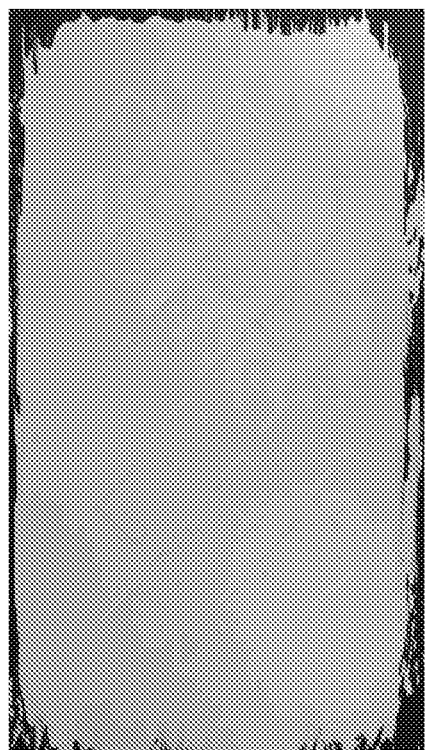
FIG. 11 shows a photograph taken by a visible light camera of the component prepared according to Example 5.
Figure 12:
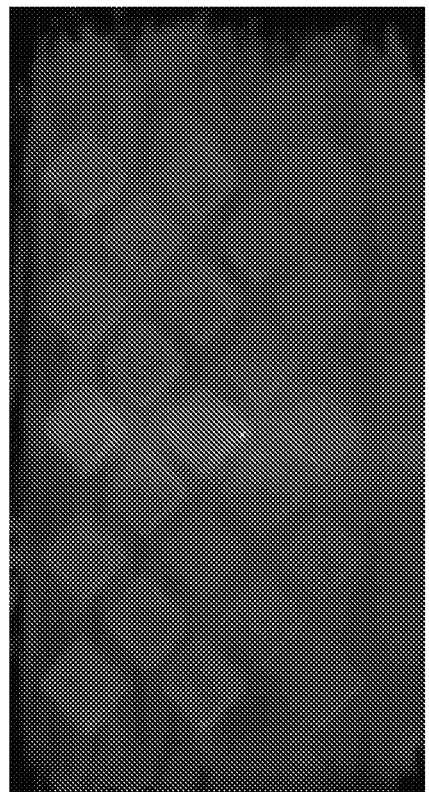
FIG. 12 shows a photograph taken by a short wave near infrared camera of the component prepared according to Example 5.

Similar to Example 4, in Example 5, the same layered structure (from FIG. 7 was formed). However, in this Example, the composition of coating B from Example 4 was applied as coating A, and the composition of coating A for Example 4 was applied as coating B. FIG. 11 shows an image of the coating system rendered by a visible light camera. FIG. 12 shows an image of the coating system rendered by an IR light camera in the range of 1100 nm to 2350 nm.

Whereas particular embodiments of this invention have been described above for purposes of illustration, it will be evident to those skilled in the art that numerous variations of the details of the present invention may be made without departing from the invention as defined in the appended claims.

The invention claimed is:

1. A coating system configured to enable detection of a concealed pattern, comprising:
    a first coating layer comprising a pattern disposed over at least a portion of the substrate, wherein the first coating layer forms the pattern in a shape of a machine-readable image, barcode, or QR code using a plurality of regions using a combination of near-IR absorptive and near-IR emissive material; and
    a second coating layer applied over the first coating layer, the second coating layer comprising a visibly opaque layer that is substantially free of $TiO_2$, the visibly opaque layer being near-IR transparent, the visibly opaque layer comprising an infrared transparent pigment disposed over the pattern,
    wherein the emissivity and/or absorbance of infrared electromagnetic radiation by the pattern at a wavelength in the range of 700 to 1100 nm differs from the emissivity and/or absorbance by the contrasting regions of the pattern of the first coating layer at the wavelength using regions of near-IR absorptive and near-IR emissive material;
    wherein the visibly opaque layer is substantially free of an infrared absorbing pigment and/or an infrared emissive pigment, such that the combination of near-IR absorptive and near-IR emissive material beneath the second coating layer is detectable through the second coating layer at the wavelength;
    wherein the near-IR emissive material comprises an infrared fluorescent pigment.

2. The coating system as recited claim 1, wherein:
    the substrate provides the near-IR absorptive material;
    first coating layer provides the near-IR emissive material, and
    the substrate and first coating layer combine to provide the plurality of regions where at least some regions are near-IR absorptive and other regions in the plurality are near-IR emissive at the wavelength.

3. The coating system of claim 1, wherein the substrate comprises a vehicle coating system.

4. The coating system of claim 1, wherein the first coating layer forms the pattern in connection with a template or mask.

5. The component of claim 1, further comprising
a second pattern disposed over the substrate;
wherein the emissivity and/or absorbance of infrared electromagnetic radiation by the pattern at the wavelength differs from the emissivity and/or absorbance by the second pattern at the same wavelength.

6. The component of claim 1, wherein the visibly opaque layer comprises less than 0.5 weight % of titanium dioxide.

7. A coating system configured to enable detection of a concealed pattern, comprising:
a first coating layer comprising a pattern disposed over a primer layer, the primer layer being disposed over at least a portion of the substrate, wherein the first coating layer forms the pattern in a shape of a machine-readable image, barcode, or QR code using a plurality of regions provided in part by the first coating layer and in part by the primer layer, wherein at least one region in the plurality comprises near-IR absorptive material, and at least one region in the plurality comprises near-IR emissive material; and
a second coating layer applied over the first coating layer, the second coating layer comprising a visibly opaque layer that is substantially free of $TiO_2$, the visibly opaque layer being near-IR transparent, the visibly opaque layer comprising an infrared transparent pigment disposed over the pattern,
wherein the emissivity and/or absorbance of infrared electromagnetic radiation by the first coating layer at a wavelength in the range of 700 to 1100 nm differs from the emissivity and/or absorbance of the primer layer at the same wavelength;
wherein the visibly opaque layer is substantially free of an infrared absorbing pigment and/or an infrared emissive pigment, such that the combination of near-IR absorptive and near-IR emissive material beneath the second coating layer is detectable through the second coating layer at the wavelength.

8. The coating system of claim 7, wherein the pattern comprises an infrared emissive pigment and the primer layer is substantially free of any infrared emissive pigment.

9. The coating system of claim 7, wherein the primer layer comprises an infrared emissive pigment and the pattern is substantially free of any infrared emissive pigment.

10. The coating system of claim 7, wherein the substrate comprises a vehicle coating system.

11. The coating system of claim 7, wherein the infrared emissive pigment comprises a fluorescent pigment selected from any one or more of metallic pigments, metal oxides, mixed metal oxides, metal sulfides, metal selenides, metal tellurides, metal silicates, inorganic oxides, inorganic silicates, alkaline earth metal silicates, and/or combinations thereof.

12. The coating system of claim 7, wherein the infrared emissive pigment comprises a fluorescent pigment selected from any one or more of: Egyptian blue ($CaCuSi_4O_{10}$), Han blue ($BaCuSi_4O_{10}$), Han purple ($BaCuSi_2O_6$), $SrCuSi_4O_{10}$, Ruby ($Al_2O_3$:Cr), Cadmium pigments in the form of CdSe and CdTe compounds, zirconia red in the form of red cadmium pigments coated with a zirconium silicate glass, indigo, blue verditer ($2CuCO_3 \cdot Cu(OH)_2$), copper blue, azurite ($Cu_3(CO_3)_2(OH)_2$), Ploss blue (($CuCa$)($CH_3COO$)$_2 \cdot 2H_2O$), smalt ($CoO \cdot K \cdot Si$), doped compounds of: ZnO, ZnS, ZnSe, or ZnTe, certain direct bandgap semiconductors, such as (Al,Ga)As, InP, Nd doped yttrium aluminum garnet, titanium doped sapphire, LiA102:Fe, CaS:Yb, spiro[indeno[1,2-b]chromene-10,1'-isobenzofuran]-3'-ones, 7-(dialkylamino)-3'H,11H-spiro[indeno[1,2-b]-chromene-10,1'-isobenzofuran]-3'-ones, changsha (CS1-6) infrared fluorophores, thienopyrazines, rhodamines, such as aminobenzofuran-fused rhodamine dyes (AFR dyes) containing amino groups, sulforhodamine dyes, perylenediimide or hexarylenediimides, donor-acceptor charge transfer compounds such as substituted thiophenes, diphenylbenzobisthiadiazoles, and selenium or tellurium substituted derivatives, cyclic polyenes, cyclic polyene-ynes, perylenes, perylenebis(dicarboximide)s such as perylene bis(phenethylimide, or perylene bis(2,5-di-tertbutylphenylimide), perylene diimides containing nitrogen donor groups, polymethines, borondipyrromethenes, pyrrolopyrrole cyanines, squaraine dyes, tetrathiafulvalene, thiadiazole fused chromophores, phthalocyanine and porphyrin derivatives, metalloporphyrins, BODIPY (borondipyrromethane) dyes, tricarbocyanines, rubrenes, carbon nanotubes, graphene, and graphene oxide and/or combinations thereof.

13. A coating system configured to enable detection of a concealed pattern, comprising:
a first coating layer comprising a pattern disposed over at least a portion of the substrate, wherein the first coating layer forms the pattern in a shape of a machine-readable image, barcode, or QR code using a plurality of regions using a combination of near-IR absorptive and near-IR emissive material; and
a second coating layer comprising a visibly opaque layer that comprises $TiO_2$ in a form that is visibly opaque but transparent at a near-IR wavelength selected from the range of from 1100 nm to 2500 nm, the visibly opaque layer comprising TiO2 at an average particle size from 0.1 to 1 μm;
wherein the emissivity and/or absorbance of infrared electromagnetic radiation by the pattern at a wavelength in the range of 1100 to 2500 nm differs from the emissivity and/or absorbance by the contrasting regions of the pattern of the first coating layer at the wavelength using regions of near-IR absorptive and near-IR emissive material;
wherein the visibly opaque layer is substantially free of an infrared absorbing pigment and/or an infrared emissive pigment, such that the combination of near-IR absorptive and near-IR emissive material beneath the second coating layer is detectable through the second coating layer at the wavelength;
wherein the near-IR emissive material comprises an infrared fluorescent pigment.

14. The coating system as recited in claim 13, wherein the first coating layer is disposed over a primer which is disposed over a least a portion of a substrate, wherein the emissivity and/or absorbance of infrared electromagnetic radiation by the pattern at the wavelength differs from the emissivity and/or absorbance by the primer layer and/or the substrate at the same wavelength.

15. The coating system as recited in claim 13, wherein additional infrared transparent pigment comprises a pigment selected from the group consisting of copper phthalocyanine pigment, halogenated copper phthalocyanine pigment, anthraquinone pigment, quinacridone pigment, perylene pigment, monoazo pigment, disazo pigment, quinophthalone pigment, indanthrone pigment, dioxazine pigment, isoindoline pigment, diarylide yellow pigment, brominated anthranthrone pigment, azo metal complex pigment, and combinations thereof.

16. The coating system as recited in claim 13, wherein the pattern comprises a machine-readable code.

17. The coating system as recited in claim 13, wherein the substrate comprises a vehicle component.

18. The coating system as recited in claim 13, wherein the substrate comprises an architectural surface, such as an interior wall, floor, or ceiling, or such as an exterior wall or roof.

19. The coating system as recited in claim 13, wherein the substrate comprises a surface in a virtual or augmented reality environment.

20. The coating system as recited in claim 13, further comprising:
 applying a second pattern over the substrate,
 wherein the emissivity and/or absorbance of infrared electromagnetic radiation by the pattern at a wavelength differs from the emissivity and/or absorbance by the second pattern at the same wavelength.

\* \* \* \* \*